United States Patent
Kang et al.

(10) Patent No.: US 12,219,630 B2
(45) Date of Patent: Feb. 4, 2025

(54) METHOD AND APPARATUS FOR PROCESSING OUT-OF-ORDER DELIVERY FOR PDCP LAYER IN WIRELESS D2D COMMUNICATION SYSTEM

(71) Applicant: SAMSUNG ELECTRONICS CO., LTD., Suwon-si (KR)

(72) Inventors: Hyunjeong Kang, Suwon-si (KR); Sangkyu Baek, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 237 days.

(21) Appl. No.: 17/754,410

(22) PCT Filed: Sep. 29, 2020

(86) PCT No.: PCT/KR2020/013366
§ 371 (c)(1),
(2) Date: Mar. 31, 2022

(87) PCT Pub. No.: WO2021/066538
PCT Pub. Date: Apr. 8, 2021

(65) Prior Publication Data
US 2022/0386396 A1    Dec. 1, 2022

(30) Foreign Application Priority Data

Oct. 2, 2019 (KR) .................. 10-2019-0122657
Mar. 23, 2020 (KR) .................. 10-2020-0035233

(51) Int. Cl.
*H04W 76/14* (2018.01)
*H04W 28/04* (2009.01)

(52) U.S. Cl.
CPC ........... *H04W 76/14* (2018.02); *H04W 28/04* (2013.01)

(58) Field of Classification Search
CPC .............................. H04W 76/14; H04W 28/04
See application file for complete search history.

(56) References Cited

U.S. PATENT DOCUMENTS 8,159,965 B2    4/2012  Tseng
10,299,177 B2   5/2019  Worrall et al.
(Continued)

FOREIGN PATENT DOCUMENTS

KR    10-0988874 B1    10/2010

OTHER PUBLICATIONS

International Search Report and Written Opinion of the International Searching Authority in connection with International Application No. PCT/KR2020/013366 issued Jan. 13, 2021, 9 pages.
(Continued)

*Primary Examiner* — Michael A Keller

(57) ABSTRACT

According to an embodiment of the disclosure, provided are an operation method of a first user equipment (UE), and the first UE, in a wireless communication system. The operation method of the first UE includes: transmitting, to a second UE, UE sidelink capability information including out-of-order delivery capability information of a packet data convergence protocol (PDCP) layer of the first UE; and receiving, from the second UE, out-of-order delivery configuration information configured for a sidelink radio bearer, based on the out-of-order delivery capability information of the PDCP layer of the first UE. Also, the operation method of the first UE further includes processing sidelink data received from the second UE, based on the out-of-order delivery configuration information.

8 Claims, 15 Drawing Sheets

(56) References Cited

U.S. PATENT DOCUMENTS

| | | | |
|---|---|---|---|
| 2012/0281564 A1 | 11/2012 | Zhang et al. | |
| 2019/0044880 A1 | 2/2019 | Yi et al. | |
| 2019/0280826 A1* | 9/2019 | Yi | H04L 1/1864 |
| 2021/0306913 A1* | 9/2021 | Li | H04W 76/11 |
| 2022/0174763 A1* | 6/2022 | Wang | H04W 12/0471 |
| 2024/0138021 A1* | 4/2024 | Zheng | H04W 4/06 |

OTHER PUBLICATIONS

OPPO, "Discussion on PDCP aspects for NR-V2X", R2-1908714, 3GPP TSG-RAN WG2 Meeting #107, Prague, Czech, Aug. 26-30, 2019, 7 pages.

ZTE, "Report of email discussion [106#81][NR/V2X] SLRB", R2-1909074, 3GPP TSG-RAN WG2#107, Prague, Czech Republic, Aug. 26-30, 2019, 69 pages.

LG Electronics Inc., "[Running CR] Introduction of 5G V2X with NR Sidelink", R2-1911682, 3GPP TSG-RAN WG2 Meeting #107, Prague, Czech Republic, Aug. 26-30, 2019, 13 pages.

\* cited by examiner

METHOD AND APPARATUS FOR PROCESSING OUT-OF-ORDER DELIVERY FOR PDCP LAYER IN WIRELESS D2D COMMUNICATION SYSTEM

CROSS-REFERENCE TO RELATED APPLICATIONS

This application is a 371 of International Application No. PCT/KR2020/013366, filed Sep. 29, 2020, which claims priority to Korean Patent Application No. 10-2019-0122657, filed Oct. 2, 2019, and Korean Patent Application No. 10-2020-0035233, filed Mar. 23, 2020, the disclosures of which are herein incorporated by reference in their entirety.

BACKGROUND

1. Field

The disclosure generally relates to a wireless communication system, and more particularly, to an apparatus and method for processing out-of-order delivery in a packet data convergence protocol (PDCP) layer in a wireless device-to-device (D2D) communication system.

2. Description of Related Art

To meet the increase in demand with respect to wireless data traffic after the commercialization of 4th generation (4G) communication systems, considerable efforts have been made to develop pre-5th generation (5G) communication systems or 5G communication systems. This is one reason why '5G communication systems' or 'pre-5G communication systems' are called 'beyond 4G network communication systems' or 'post Long-Term Evolution (LTE) systems.' In order to achieve a high data rate, 5G communication systems are being developed to be implemented in a super-high frequency band (millimeter wave (mmWave)), e.g., a band of 60 GHz. In order to reduce a path loss of radio waves in such a super-high frequency band and to increase a transmission distance of radio waves in 5G communication systems, various technologies have been discussed and are being studied, for example: beamforming, massive multiple-input multiple-output (MIMO), full dimensional MIMO (FD-MIMO), array antennas, analog beam-forming, and large-scale antennas. In order to improve system networks for 5G communication systems, various technologies have been developed, e.g., evolved small cells, advanced small cells, cloud radio access networks (Cloud-RAN), ultra-dense networks, device-to-device communication (D2D), wireless backhaul, moving networks, cooperative communication, coordinated multi-points (CoMP), and interference cancellation. Also, for 5G communication systems, other technologies have been developed, e.g., hybrid frequency-shift keying (FSK) and quadrature amplitude modulation (QAM) (FQAM) and sliding window superposition coding (SWSC), which are advanced coding modulation (ACM) schemes, and filter bank multi carrier (FBMC), non-orthogonal multiple access (NOMA), and sparse code multiple access (SCMA), which are advanced access schemes.

The Internet has evolved from a human-based connection network, where humans create and consume information, to the Internet of things (IoT), where distributed components, such as objects, exchange information with each other to process the information. Internet of everything (IoE) technology is emerging, in which technology related to the IoT is combined with, for example, technology for processing big data through connection with a cloud server. In order to implement the IoT, various technological components are required, such as sensing technology, wired/wireless communication and network infrastructures, service interface technology, security technology, etc. In recent years, technologies including a sensor network for connecting objects, machine to machine (M2M) communication, machine type communication (MTC), etc. have been studied. In the IoT environment, intelligent Internet technology (IT) services may be provided to collect and analyze data obtained from objects connected to each other to create new value in human life. As existing information technology (IT) techniques and various industries converge and combine with each other, the IoT may be applied to various fields, such as smart homes, smart buildings, smart cities, smart cars or connected cars, smart grids, health care, smart home appliances, high quality medical services, etc.

Various attempts are being made to apply 5G communication systems to the IoT network. For example, technologies related to sensor networks, M2M communication, MTC, etc., are being implemented by using 5G communication technology including beam-forming, MIMO, array antennas, etc. The application of cloud radio access network (RAN) as a big data processing technology described above may be an example of convergence of 5G communication technology and IoT technology.

In the 5G communication system, communication using vehicles, for example, vehicle-to-vehicle, vehicle-to-terminal, or vehicle-to-structure (hereinafter, vehicle-to-everything (V2X)), is being studied, and it is expected that various services may be provided to a user by using the V2X.

SUMMARY

An embodiment of the disclosure provides an apparatus and method for processing out-of-order delivery in a packet data convergence protocol (PDCP) layer in a wireless device-to-device (D2D) communication system.

In a wireless communication system according to an embodiment of the disclosure, an operation method of a first terminal, and the first terminal may be provided. The operation method of the first terminal includes: transmitting, to a second terminal, sidelink capability information of a terminal including out-of-order delivery capability information of a packet data convergence protocol (PDCP) layer of the first terminal; and receiving, from the second terminal, out-of-order delivery configuration information configured for a sidelink radio bearer, based on the out-of-order delivery capability information of the PDCP layer of the first terminal. Also, the operation method of the first terminal further includes processing sidelink data received from the second terminal, based on the out-of-order delivery configuration information.

According to an embodiment of the disclosure, out-of-order delivery in a packet data convergence protocol (PDCP) layer can be processed in a wireless device-to-device (D2D) communication system.

DETAILED DESCRIPTION

Figure 1:
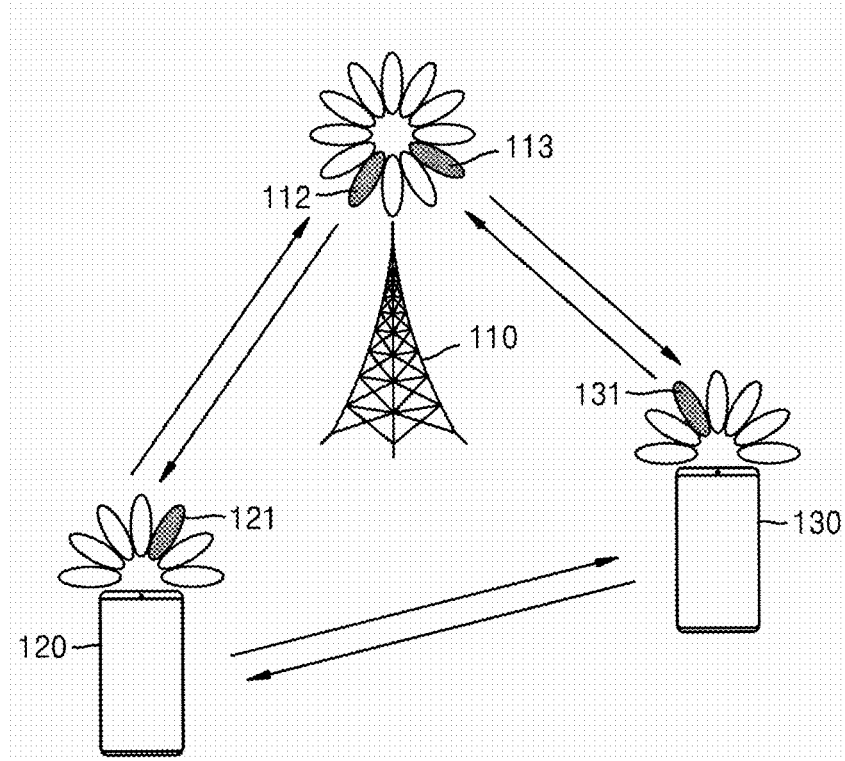
FIG. 1 illustrates a wireless communication system according to various embodiments of the disclosure.

In a wireless communication system according to an embodiment of the disclosure, an operation method of a first user equipment (UE) may be provided. The operation method includes: transmitting, to a second UE, UE sidelink capability information including out-of-order delivery capability information of a packet data convergence protocol (PDCP) layer of the first UE; receiving, from the second UE, out-of-order delivery configuration information configured for a sidelink radio bearer, based on the out-of-order delivery capability information of the PDCP layer of the first UE; and processing sidelink data received from the second UE, based on the out-of-order delivery configuration information.

The processing of the sidelink data received from the second UE may include: receiving, from a lower layer, a PDCP protocol data unit (PDU) by the PDCP layer of the first UE; identifying whether out-of-order delivery is configured for the sidelink radio bearer; and transmitting, to a upper layer, a PDCP service data unit (SDU) by the PDCP layer of the first UE in case that the out-of-order delivery is configured for the sidelink radio bearer.

The UE sidelink capability information may be transmitted to the second UE via PC5 radio resource control (RRC) signaling.

The out-of-order delivery configuration information may be received from the second UE via PC5 RRC signaling.

The out-of-order delivery configuration information and the UE sidelink capability information of may be applied to sidelink unicast communication.

In a wireless communication system according to an embodiment, an operation method of a second UE may be provided. The operation method includes: receiving, from a first UE, UE sidelink capability information including out-of-order delivery capability information of a packet data convergence protocol (PDCP) layer of the first UE; configuring out-of-order delivery configuration information for a sidelink radio bearer, based on the out-of-order delivery capability information of the PDCP layer; and transmitting the out-of-order delivery configuration information to the first UE.

The UE sidelink capability information may be received from the first UE via PC5 radio resource control (RRC) signaling.

The out-of-order delivery configuration information may be transmitted to the first UE via PC5 RRC signaling.

The out-of-order delivery configuration information and the UE sidelink capability information may be applied to sidelink unicast communication.

In a wireless communication system according to an embodiment of the disclosure, a first UE may be provided. The first UE includes: a transceiver; and at least one processor configured to operate by being connected to the transceiver.

The at least one processor is further configured to: transmit, to a second UE through the transceiver, UE sidelink capability information including out-of-order delivery capability information of a packet data convergence protocol (PDCP) layer of the first UE; receive, from the second UE through the transceiver, out-of-order delivery configuration information configured for a sidelink radio bearer, based on the out-of-order delivery capability information of the PDCP layer of the first UE; and process sidelink data received from the second UE, based on the out-of-order delivery configuration information.

The at least one processor may be further configured to: control the PDCP layer of the first UE to receive a PDCP protocol data unit (PDU) from a lower layer; identify whether out-of-order delivery is configured for the sidelink radio bearer; and control the PDCP layer of the first UE to transmit a PDCP service data unit (SDU) to a upper layer in case that the out-of-order delivery is configured for the sidelink radio bearer.

The UE sidelink capability information may be transmitted to the second UE via PC5 radio resource control (RRC) signaling.

The out-of-order delivery configuration information may be received from the second UE via PC5 RRC signaling.

The out-of-order delivery configuration information and the UE sidelink capability information may be applied to sidelink unicast communication.

Hereinafter, embodiments of the disclosure will be described with reference to accompanying drawings. In describing the embodiments, descriptions of technical contents that are well known in the technical field to which the disclosure belongs and are not directly related to the disclosure will be omitted. By omitting the unnecessary description, the gist of the disclosure may be more clearly conveyed without obscuring the subject matter.

For the same reasons, components may be exaggerated, omitted, or schematically illustrated in drawings for clarity. Also, the size of each component does not completely reflect the actual size. In the drawings, like reference numerals denote like elements.

Advantages and features of the disclosure and methods of accomplishing the same may be understood more readily by reference to the following detailed description of the embodiments and the accompanying drawings. In this regard, the embodiments of the disclosure may have different forms and should not be construed as being limited to the descriptions set forth herein. Rather, these embodiments are provided so that the disclosure will be thorough and complete and will fully convey the concept of the disclosure to one of ordinary skill in the art, and the disclosure will only be defined by the appended claims. Throughout the specification, like reference numerals denote like elements.

Here, it will be understood that combinations of blocks in flowcharts or process flow diagrams may be performed by computer program instructions. Because these computer program instructions may be loaded into a processor of a general-purpose computer, a special purpose computer, or another programmable data processing apparatus, the instructions, which are performed by a processor of a computer or another programmable data processing apparatus, create units for performing functions described in the flowchart block(s). The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufacturing items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It should also be noted that in some alternative implementations, functions mentioned in blocks may occur out of order. For example, two blocks illustrated successively may actually be executed substantially concurrently, or the blocks may sometimes be performed in a reverse order according to the corresponding function.

Here, the term "unit" in the embodiments means a software component or hardware component such as a field-programmable gate array (FPGA) or an application-specific integrated circuit (ASIC), and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units". Furthermore, the components and "units" may be embodied to reproduce one or more central processing units (CPUs) in a device or security multimedia card. Also, in the embodiments, the "unit" may include at least one processor.

Also, terms for identifying access nodes, terms denoting network entities, terms denoting messages, terms denoting interfaces between network entities, terms denoting various types of identification information, etc. used herein are exemplified for convenience of description. Thus, the terms used in the disclosure are not limited and other terms denoting targets having the same technical meanings may be used.

Hereinafter, for convenience of description, the disclosure uses terms and names defined by the 3rd generation partnership project long term evolution (3GPP LTE) standard, or terms and names modified based thereon. However, the disclosure is not limited by such terms and names, and may be equally applied to systems conforming to other standards. In particular, the disclosure may be applied to 3GPP new radio (NR) (5th generation (5G) mobile communication standard). Also, the disclosure may be applied to intelligent services (e.g., smart homes, smart buildings, smart cities, smart cars or connected cars, health care, digital education, retail business, and security and safety related services) based on 5G communication technology and Internet of things (IoT) related technology.

Hereinafter, a base station (BS) is an entity that allocates resources of a terminal, and may be at least one of a gNode B (gNB), an cNode B (eNB), a Node B (NB), a wireless access unit, a BS controller, or a node on a network. Examples of a terminal may include user equipment (UE), a mobile station (MS), a cellular phone, a smartphone, a computer, and a multimedia system capable of performing a communication function. However, these are only examples and the base station and the terminal are not limited by those examples. In the disclosure, an evolved node B (eNB) will be used interchangeably with a next generation node B (gNB) for convenience of description. In other words, a base station described as an eNB may also indicate a gNB. In the disclosure, the term 'terminal' may indicate not only mobile phones, narrow band-Internet of things (NB-IoT) devices, and sensors, but also various wireless communication devices.

Hereinafter, in the disclosure, a physical channel and a signal may be used interchangeably with data or a control signal. For example, a physical downlink shared channel (PDSCH) is a term referring to a physical channel where data is transmitted, but the PDSCH may also be used to refer to data. In other words, in the disclosure, the expression "a physical channel is transmitted" may be equally interpreted as the expression "data or a signal is transmitted via a physical channel".

In the disclosure hereinafter, upper layer signaling denotes a method of transmitting a signal from a base station to a terminal by using a downlink data channel of a physical layer or from a terminal to a base station by using an uplink data channel of a physical layer. The upper layer signaling may be understood as radio resource control (RRC) signaling or a media access control (MAC) control element (CE).

In the disclosure hereinafter, an apparatus and method for processing a sidelink packet data convergence protocol (PDCP) layer operation in a wireless communication system are described. Also, in the disclosure, an apparatus and method for supporting sidelink PDCP out-of-order delivery in a wireless communication system are described. In addition, in the disclosure, an apparatus and method for configuring and processing sidelink PDCP out-of-order delivery in a wireless communication system are described.

According to various embodiments of the disclosure, an operation method of a terminal in a wireless communication system may include determining whether the terminal performing device-to-device (D2D) communication supports PDCP out-of-order delivery, obtaining an out-of-order delivery configuration for sidelink radio bearer (SLRB) of the terminal supporting the PDCP out-of-order delivery, and processing a packet according to the out-of-order delivery configuration of the SLRB. Another operation method of a terminal may include obtaining a PDCP out-of-order delivery configuration from another terminal, and processing a PDCP packet according to the out-of-order delivery configuration.

According to various embodiments of the disclosure, a terminal in a wireless communication system includes a transceiver and at least one processor connected to the transceiver. The at least one processor may determine PDCP out-of-order delivery support capability regarding a sidelink, determine PDCP out-of-order delivery configuration information regarding an SLRB, and determine PDCP out-of-order delivery processing.

According to various embodiments of the disclosure, an operation method of a base station in a wireless communication system may include determining out-of-order delivery support capability of a PDCP layer for sidelink communication of a terminal, determining an out-of-order delivery function of the PDCP layer regarding a PC5 unicast link, a PC5 groupcast link, or a PC5 broadcast link for the sidelink communication of the terminal, and transmitting out-of-order delivery function configuration information to the terminal.

According to various embodiments of the disclosure, an operation method of a terminal in a wireless communication system may include determining PDCP out-of-order delivery capability for sidelink communication of the terminal, obtaining PDCP out-of-order delivery configuration information regarding a PC5 link, transmitting PDCP out-of-order delivery configuration information regarding a PC5 unicast link to a counterpart terminal, and performing in-order delivery in a PDCP layer when an out-of-order delivery function of the PDCP layer is configured according to the PDCP out-of-order delivery configuration information.

According to various embodiments of the disclosure, an operation method of a base station in a wireless communication system may include obtaining, from a terminal, PDCP out-of-order delivery capability regarding a PC5 link for sidelink communication of the terminal, and generating PDCP out-of-order delivery function configuration information and transmitting the same to the terminal.

An apparatus and method according to various embodiments of the disclosure support a PDCP out-of-order delivery function in a sidelink, thereby effectively supporting various services in a D2D communication system considering quality of service (QOS) levels required by the services.

An apparatus and method according to various embodiments of the disclosure may support a PDCP out-of-order delivery function without a D2D unicast link configuration in a D2D communication system.

The effects obtainable in the disclosure are not limited to the above-mentioned effects, and other effects not mentioned may be clearly understood by one of ordinary skill in the art from the description below.

FIG. 1 illustrates a wireless communication system according to various embodiments of the disclosure.

FIG. 1 illustrates a base station 110, a terminal 120, and a terminal 130, as some of nodes using a wireless channel in a wireless communication system. FIG. 1 illustrates only one base station 110, but the wireless communication system may further include a base station that is the same as or similar to the base station 110.

The base station 110 is a network infrastructure providing a wireless access to the terminals 120 and 130. The base station 110 has coverage defined by a certain geographic area, based on a range within which a signal is transmittable. The base station 110 may be referred to as, in addition to a base station, an access point (AP), an evolved node B (eNB), a 5th generation (5G) node, a next-generation node B (gNB), a wireless point, a transmission/reception point (TRP), or another term having an equivalent technical meaning.

Each of the terminal 120 and the terminal 130 is an apparatus used by a user and performs communication with the base station 110 via a wireless channel. A link heading from the base station 110 towards the terminal 120 or terminal 130 is referred to as a downlink (DL), and a link heading from the terminal 120 or terminal 130 towards the base station 110 is referred to as an uplink (UL). Also, the terminal 120 and the terminal 130 may perform communication with each other via a wireless channel. Here, a link between the terminal 120 and the terminal 130 is referred to as a sidelink, and the sidelink may be interchangeably used with a PC5 interface. In some cases, at least one of the terminal 120 and the terminal 130 may operate without involvement by the user. In other words, at least one of the terminal 120 and the terminal 130 is an apparatus performing machine type communication (MTC), and may not be carried by the user. The terminal 120 and the terminal 130 may each be referred to as, in addition to a terminal, a user equipment (UE), a mobile station, a subscriber station, a remote terminal, a wireless terminal, a user device, or another term having an equivalent technical meaning.

The base station 110, the terminal 120, and the terminal 130 may transmit and receive a wireless signal in a millimeter wave (mmWave) band (for example, 28 GHZ, 30 GHz, 38 GHz, or 60 GHz). Here, for improvement of a channel gain, the base station 110, the terminal 120, and the terminal 130 may perform beamforming. Here, the beamforming may include transmission beamforming and reception beamforming. In other words, the base station 110, the terminal 120, and the terminal 130 may assign directivity to a transmission signal or a reception signal. To do so, the base station 110 and the terminals 120 and 130 may select serving beams 112, 113, 121, and 131 via a beam search or beam management procedure. After the serving beams 112, 113, 121, and 131 are selected, communication thereafter may be performed via a resource in a quasi-co-located (QCL) relationship with a resource transmitting the serving beams 112, 113, 121, and 131.

It may be evaluated that a first antenna port and a second antenna port are in a QCL relationship when large-scale characteristics of a channel that transmitted a symbol on the first antenna port are able to be inferred from a channel that transmitted a symbol on the second antenna port. For example, the large-scale characteristics may include at least one of delay spread, Doppler spread, Doppler shift, average gain, average delay, and spatial receiver parameter.

The terminal 120 and the terminal 130 shown in FIG. 1 may support vehicle communication. Regarding the vehicle communication, the standardization of a vehicle-to-everything (V2X) technology has been completed in 3GPP Release 14 and Release 15, based on a device-to-device (D2D) communication structure in an LTE system, and currently, efforts are being made to develop the V2X technology based on 5G new radio (NR). In NR V2X, unicast communication, group cast (or multicast) communication, and broadcast communication are to be supported among devices. Also, unlike LTE V2X that aims at transmitting/receiving basic safety information required for driving of a vehicle, NR V2X aims at providing further advanced services, such as platooning, advanced driving, extended sensor, and remote driving.

V2X services may be classified into a basic safety service and an advanced service. The basic safety service may include from a vehicle notification (a cooperative awareness message (CAM) or basic safety message (BSM)) service to detailed services, such as a left turn notification service, a front vehicle collision warning service, an emergency vehicle approach notification service, a forward obstacle warning service, and an intersection signal information service, and V2X information may be transmitted/received by using a broadcast, unicast, or groupcast transmission method. The advanced service has strengthened quality of service (QOS) requirements compared to the basic safety service, and requires a method of transmitting/receiving V2X information by using unicast and groupcast transmission methods in addition to broadcast, such that the V2X information is transmitted/received within a specific vehicle group or the V2X information is transmitted/received between two vehicles. The advanced service may include detailed services, such as a platooning service, an autonomous driving service, a remote driving service, and an extended sensor-based V2X service.

Hereinafter, a sidelink refers to a signal transmission/reception path between terminals, and may be interchangeably used with a PC5 interface. Hereinafter, a base station is an entity performing resource allocation to a terminal, and may be a base station supporting both V2X communication and general cellular communication or a base station supporting only V2X communication. In other words, the base station may denote an NR base station (for example, gNB), an LTE base station (for example, eNB), or a road site unit (RSU). The terminal may include not only a general UE and a mobile station, but also a vehicle supporting vehicle-to-vehicle (V2V) communication, a vehicle or handset (for example, a smartphone) of a pedestrian supporting vehicle-to-pedestrian (V2P) communication, a vehicle supporting vehicle-to-network (V2N) communication, a vehicle supporting vehicle-to-infrastructure (V2I) communication, an RSU on which a terminal function is mounted, an RSU on which a base station function is mounted, and an RSU on which a part of a base station function and a part of a terminal function are mounted. Also, a V2X terminal used in the description below may be referred to as a terminal. In other words, a terminal may be used as a V2X terminal in relation to V2X communication.

A base station and a terminal are connected through a universal mobile communications system (UTMS) air (Uu) interface. A UL may denote a wireless link where a terminal transmits data or a control signal to a base station, and a DL may denote a wireless link where a base station transmits data or a control signal to a terminal.

Figure 2:
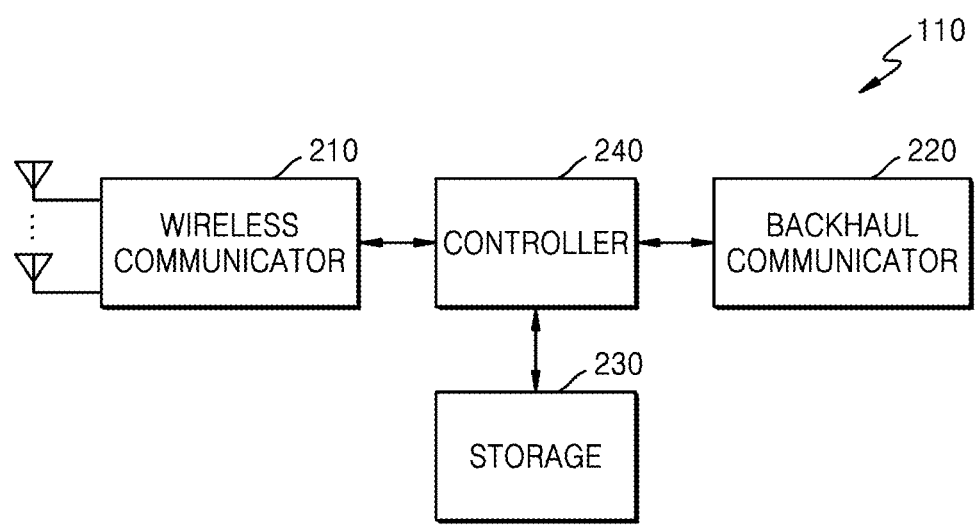
FIG. 2 illustrates a configuration of a base station in a wireless communication system, according to various embodiments of the disclosure.

FIG. 2 illustrates a configuration of a base station in a wireless communication system, according to various embodiments of the disclosure.

Referring to FIG. 2, the base station 110 includes a wireless communicator 210, a backhaul communicator 220, a storage 230, and a controller 240.

The wireless communicator 210 performs functions for transmitting/receiving a signal via a wireless channel. For example, the wireless communicator 210 may perform conversion between a baseband signal and a bitstring, based on physical layer specifications of a system. For example, during data transmission, the wireless communicator 210 generates complex symbols by encoding and modulating a transmission bitstring. Also, during data reception, the wireless communicator 210 reconstructs a reception bitstring by demodulating and decoding a baseband signal.

Also, the wireless communicator 210 up-converts a baseband signal to a radio frequency (RF) band signal and then transmits the RF band signal via an antenna, and down-converts an RF band signal received via the antenna to a baseband signal. In this regard, the wireless communicator 210 may include a transmit filter, a receive filter, an amplifier, a mixer, an oscillator, a digital-to-analog converter (DAC), and an analog-to-digital converter (ADC). Also, the wireless communicator 210 may include a plurality of transmission/reception paths. In addition, the wireless communicator 210 may include at least one antenna array including a plurality of antenna elements.

In terms of hardware, the wireless communicator 210 may include a digital unit and an analog unit, wherein the analog unit may include a plurality of sub-units according to operation power, an operation frequency, or the like. The digital unit may be implemented as at least one processor (for example, a digital signal processor (DSP)).

The wireless communicator 210 transmits and receives a signal as described above. Accordingly, the wireless communicator 210 may be entirely or partially referred to as a transmitter, a receiver, or a transceiver. In the description below, transmission and reception performed via the wireless channel may be used in the meaning that the process described above is performed by the wireless communicator 210.

The backhaul communicator 220 may provide an interface for communicating with other nodes in a network. In other words, the backhaul communicator 220 may convert a bitstring transmitted from the base station 110 to another node, for example, another access node, another base station, a higher node, or a core network, into a physical signal, and convert a physical signal received from the other node into a bitstring.

The storage 230 may store data for operations of the base station 110, e.g., basic programs, application programs, and configuration information. The storage 230 may be configured in a volatile memory, a nonvolatile memory, or a combination of a volatile memory and a nonvolatile memory. Also, the storage 230 provides stored data upon request by the controller 240.

The controller 240 may control overall operations of the base station 110. For example, the controller 240 may transmit and receive a signal via the wireless communicator 210 or via the backhaul communicator 220. The controller 240 records and read data on and from the storage 230. The controller 240 may perform functions of a protocol stack required in the communication standard. According to another embodiment, the protocol stack may be included in the wireless communicator 210. In this regard, the controller 240 may include at least one processor. According to various embodiments, the controller 240 may control the base station 110 to perform operations according to various embodiments described below.

Figure 3:
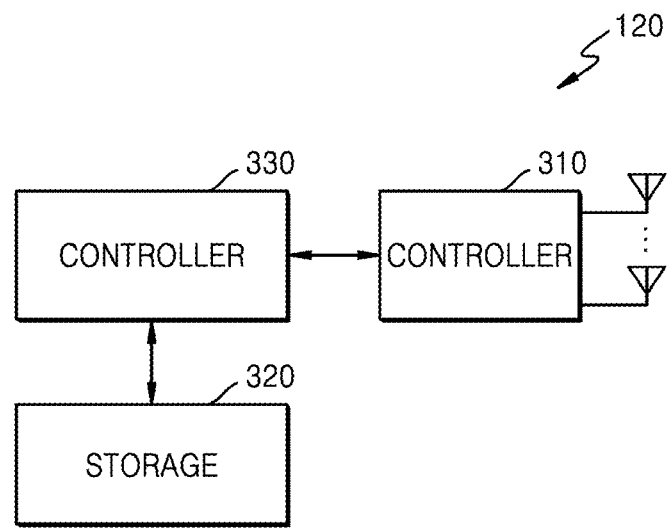
FIG. 3 illustrates a configuration of a terminal in a wireless communication system, according to various embodiments of the disclosure.

FIG. 3 illustrates a configuration of a terminal in a wireless communication system, according to various embodiments of the disclosure.

Referring to FIG. 3, the terminal 120 includes a communicator 310, a storage 320, and a controller 330.

The communicator 310 performs functions for transmitting/receiving a signal via a wireless channel. For example, the communicator 310 may perform conversion between a baseband signal and a bitstring, based on physical layer specifications of a system. For example, during data transmission, the communicator 310 generates complex symbols by encoding and modulating a transmission bitstring. Also, during data reception, the communicator 310 reconstructs a reception bitstring by demodulating and decoding a baseband signal. The communicator 310 up-converts a baseband signal to an RF band signal and then transmits the RF band signal via an antenna, and down-converts an RF band signal received via the antenna to a baseband signal. For example, the communicator 310 may include a transmit filter, a receive filter, an amplifier, a mixer, an oscillator, a DAC, and an ADC.

Also, the communicator 310 may include a plurality of transmission/reception paths. In addition, the communicator 310 may include at least one antenna array including a plurality of antenna elements. In terms of hardware, the communicator 310 may include a digital circuit and an analog circuit (for example, a radio frequency integrated circuit (RFIC)). Here, the digital circuit and the analog circuit may be implemented in one package. The communicator 310 may include a plurality of RF chains. In addition, the communicator 310 may perform beamforming.

The communicator 310 transmits and receives a signal as described above. Accordingly, the communicator 310 may be entirely or partially referred to as a transmitter, a receiver, or a transceiver. In the description below, transmission and reception performed via the wireless channel may be used in the meaning that the process described above is performed by the communicator 310.

The storage 320 may store data for operations of the terminal 120, e.g., basic programs, application programs, and configuration information. The storage 320 may be configured in a volatile memory, a nonvolatile memory, or a combination of a volatile memory and a nonvolatile memory. Also, the storage 320 provides stored data upon request by the controller 330.

The controller 330 may control overall operations of the terminal 120. For example, the controller 330 may transmit and receive a signal via the communicator 310. The controller 330 records and read data on and from the storage 320. The controller 330 may perform functions of a protocol stack required in the communication standard. In this regard, the controller 330 may include at least one processor or microprocessor, or may be a part of a processor. A part of the communicator 310 and the controller 330 may be referred to as a communication processor (CP). According to various embodiments, the controller 330 may control the terminal 120 to perform operations according to various embodiments described below.

Figure 4:
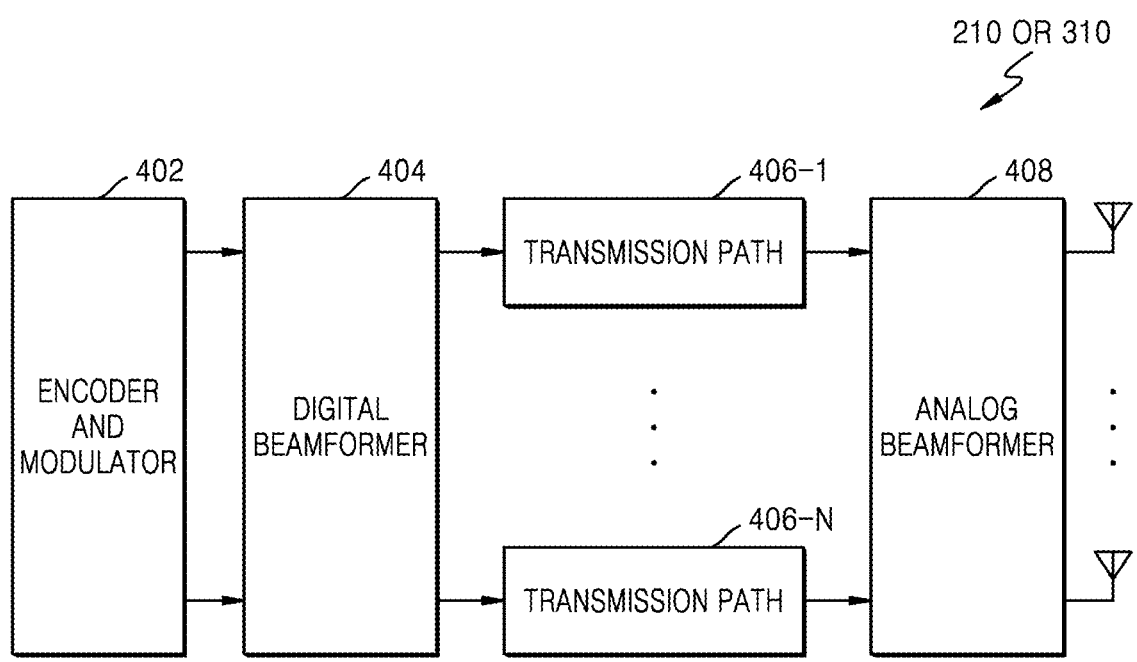
FIG. 4 illustrates a configuration of a communicator in a wireless communication system, according to various embodiments of the disclosure.

FIG. 4 illustrates a configuration of a communicator in a wireless communication system, according to various embodiments of the disclosure.

FIG. 4 illustrates an example of a detailed configuration of the wireless communicator 210 of FIG. 2 or the communicator 310 of FIG. 3. In detail, FIG. 4 illustrates components for performing beamforming, as a part of the wireless communicator 210 of FIG. 2 or the communicator 310 of FIG. 3.

Referring to FIG. 4, the wireless communicator 210 or the communicator 310 includes an encoder and modulator 402, a digital beamformer 404, a plurality of transmission paths 406-1 through 406-N, and an analog beamformer 408.

The encoder and modulator 402 performs channel encoding. For the channel encoding, at least one of low-density parity check (LDPC) code, convolution code, or polar code may be used. The encoder and modulator 402 generates modulation symbols by performing constellation mapping.

The digital beamformer 404 performs beamforming on a digital signal (for example, the modulation symbols). In this regard, the digital beamformer 404 multiplies the modulation symbols by beamforming weights. Here, the beamforming weight is used to change a size and phase of a signal, and may be referred to as a precoding matrix or a precoder. The digital beamformer 404 outputs digitally beamformed modulation symbols to the plurality of transmission paths 406-1 through 406-N. Here, according to a multiple input multiple output (MIMO) transmission technique, the modulation symbols may be multiplexed or same modulation symbols may be provided to the plurality of transmission paths 406-1 through 406-N.

The plurality of transmission paths 406-1 through 406-N convert the digitally beamformed digital signals into analog signals. In this regard, the plurality of transmission paths 406-1 through 406-N may each include an inverse fast Fourier transform (IFFT) operator, a cyclic prefix (CP) inserter, a DAC, and an up-converter. The CP inserter is for orthogonal frequency division multiplexing (OFDM) and may be excluded when another physical layer method (for example, a filter bank multi-carrier (FBMC)) is applied. In other words, the plurality of transmission paths 406-1 through 406-N provide independent signal processes for a plurality of streams generated via the digital beamforming. However, according to an embodiment, some of components of the plurality of transmission paths 406-1 through 406-N may be commonly used.

The analog beamformer 408 performs beamforming on the analog signals. In this regard, the digital beamformer 404 multiples the analog signals by beamforming weights. Here, the beamforming weight is used to change a size and phase of a signal. In detail, the analog beamformer 408 may be variously configured according to a connection structure between the plurality of transmission paths 406-1 through 406-N and antennas. For example, each of the plurality of transmission paths 406-1 through 406-N may be connected to one antenna array. As another example, the plurality of transmission paths 406-1 through 406-N may be connected to one antenna array. As another example, the plurality of transmission paths 406-1 through 406-N may be adaptively connected to one antenna array or connected to two or more antenna arrays.

Figure 5:
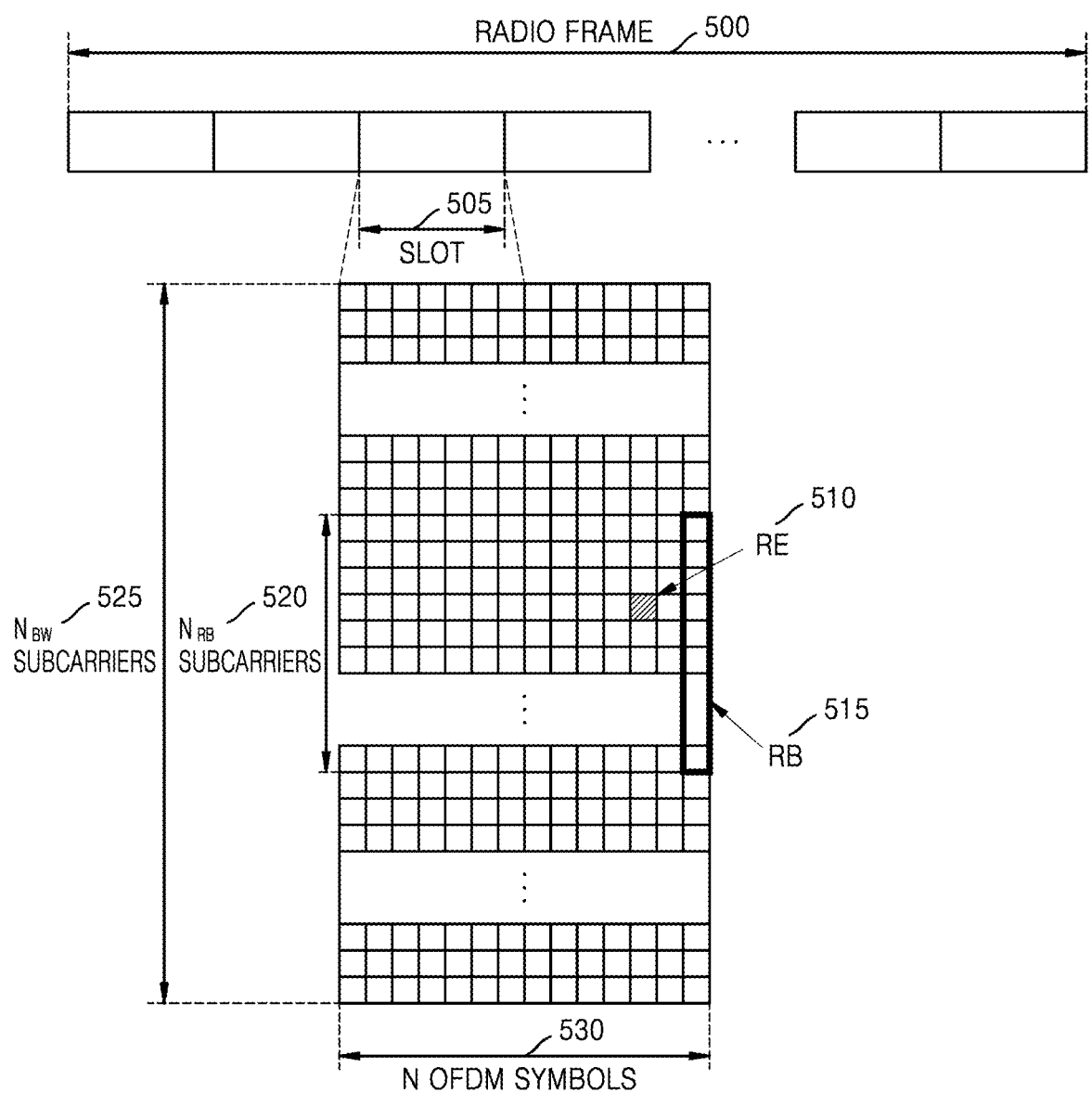
FIG. 5 illustrates a structure of a radio time-frequency resource in a wireless communication system, according to various embodiments of the disclosure.

FIG. 5 illustrates a structure of a radio time-frequency resource in a wireless communication system, according to various embodiments of the disclosure.

In FIG. 5, a horizontal axis represents a time domain and a vertical axis represents a frequency domain in a radio resource region. A minimum transmission unit in the time domain is an OFDM symbol or a discrete Fourier transform-spread (DFT-S)-OFDM symbol, and Nsymb OFDM symbols or DFT-S-OFDM symbols 530 are included in one slot 505. Unlike a slot, a length of a subframe in an NR system may be defined to be 1.0 ms, and a length of a radio frame 500 may be defined to be 10 ms. A minimum transmission unit in the frequency domain is a subcarrier, and a transmission bandwidth of the whole system may include NBW subcarriers 525 in total. Specific numerical values such as Nsymb and NBW may be variously applied according to a system.

A base unit of a time-frequency resource domain is a resource element (RE) 510, and may be indicated by an OFDM symbol index, a DFT-S-OFDM symbol index, or a subcarrier index. A resource block (RB) 515 may be defined as NRB consecutive subcarriers 520 in the frequency domain. Generally, a minimum transmission unit of data is an RB, and in the NR system, Nsymb=14 and NRB=12.

The structure of the radio time-frequency resource of FIG. 5 is applied to a Uu interface. Also, the structure of the radio time-frequency resource of FIG. 5 may be similarly applied to a sidelink.

FIGS. 6A through 6D illustrate examples of a scenario regarding sidelink communication in a wireless communication system, according to various embodiments of the disclosure.

Figure 6A:
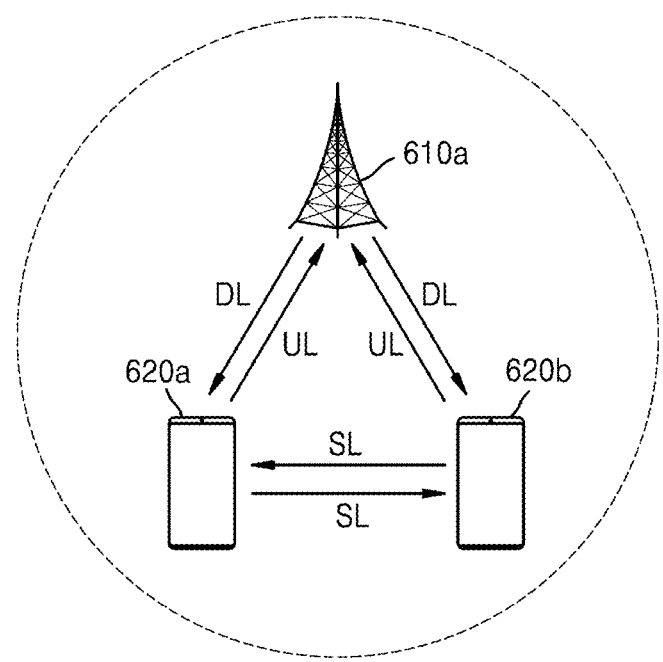
FIGS. 6A through 6D illustrate examples of a scenario regarding sidelink communication in a wireless communication system, according to various embodiments of the disclosure.

FIG. 6A illustrates an in-coverage scenario in which sidelink terminals 620a and 620b are located within coverage of a base station 610a. The sidelink terminals 620a and 620b may receive data and control information from the base station 610a via a DL or transmit data and control information to the base station 610a via a UL. Here, the data and control information may be data and control information for sidelink communication, or data and control information for general cellular communication instead of sidelink communication. Also, in FIG. 6A, the sidelink terminals 620a and 620b may transmit/receive data and control information for sidelink communication via a sidelink.

Figure 6B:
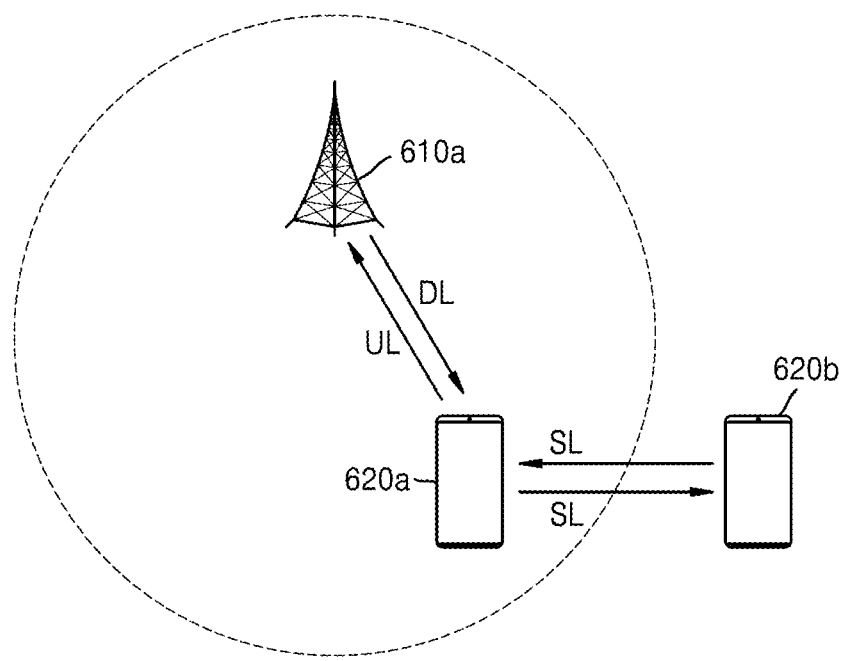

FIG. 6B illustrates a case of partial coverage in which, from among sidelink terminals, a first terminal 620a is located within coverage of the base station 610a and a second terminal 620b is located outside the coverage of the base station 610a. The first terminal 620a located within the coverage of the base station 610a may receive data and control information from the base station 610a via a DL or transmit data and control information to the base station 610a via a UL. The second terminal 620b located outside the coverage of the base station 610a is unable to receive data and control information from the base station 610a via a DL and unable to transmit data and control information to the base station 610a via a UL. The second terminal 620b may transmit/receive data and control information for sidelink communication to/from the first terminal 620a via a sidelink.

Figure 6C:
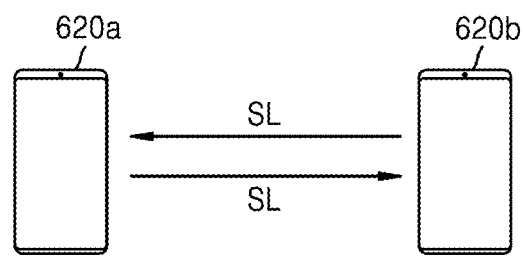

FIG. 6C illustrates a case in which sidelink terminals (for example, the first terminal 620a and the second terminal 620b) are located outside the coverage of the base station 610a. Accordingly, the first terminal 620a and second terminal 620b are unable to receive data and control information from the base station 610a via a DL and unable to transmit data and control information to the base station 610a via a UL. The first terminal 620a and second terminal 620b may transmit and receive data and control information for sidelink communication via a sidelink.

Figure 6D:
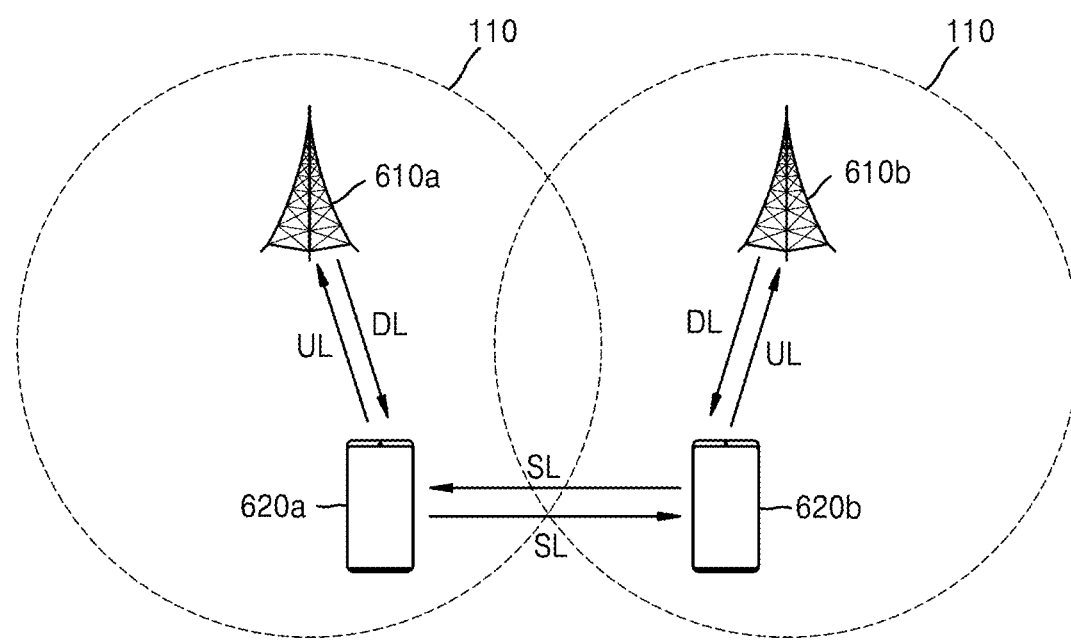

FIG. 6D illustrates a case in which inter-cell sidelink communication is performed when the first terminal 620a and second terminal 620b performing sidelink communication are accessed to different base stations (for example, a first base station 610a and a second base station 610b) (i.e., RRC-connected state) or camped (for example, RRC-released state, i.e., RRC idle state). Here, the first terminal 620a may be a sidelink transmission terminal and the second terminal 620b may be a sidelink reception terminal. Alternatively, the first terminal 620a may be a sidelink reception terminal and the second terminal 620b may be a sidelink transmission terminal. The first terminal 620a may receive a sidelink-dedicated system information block (SIB) from the accessed (or camped) first base station 610a, and the second terminal 620b may receive a sidelink-dedicated SIB from the accessed (or camped) second base station 610b. Here, information of the sidelink-dedicated SIB received by the first terminal 620a and information of the sidelink-dedicated SIB received by the second terminal 620b may be different from each other. Accordingly, it is required to unify the information to perform sidelink communication between terminals located in different cells.

In the examples of FIGS. 6A through 6D, a sidelink system including two terminals (for example, the first terminal 620a and the second terminal 620b) are described for convenience of description, but the disclosure is not limited thereto and may be applied to a sidelink system participated by three or more terminals. Also, a UL and DL between the base station 610a and sidelink terminals may be referred to as a Uu interface, and a sidelink between the sidelink terminals may be referred to as a PC5 interface. In the following description, a UL or DL and a Uu interface may be interchangeably used, and a sidelink and a PC5 may be interchangeably used.

Meanwhile, in the disclosure, a terminal may denote a vehicle supporting V2V communication, a vehicle or handset (or smartphone) of a pedestrian supporting V2P communication, a vehicle supporting V2N communication, or a vehicle supporting V2I communication. Also, in the disclosure, a terminal may denote an RSU with a terminal function, an RSU with a base station function, or an RSU with a part of a base station function and a part of a terminal function.

Figure 7A:
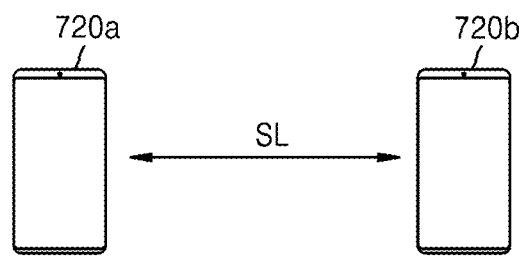
FIGS. 7A and 7B illustrate examples of a transmission method of sidelink communication in a wireless communication system, according to various embodiments of the disclosure.
Figure 7B:
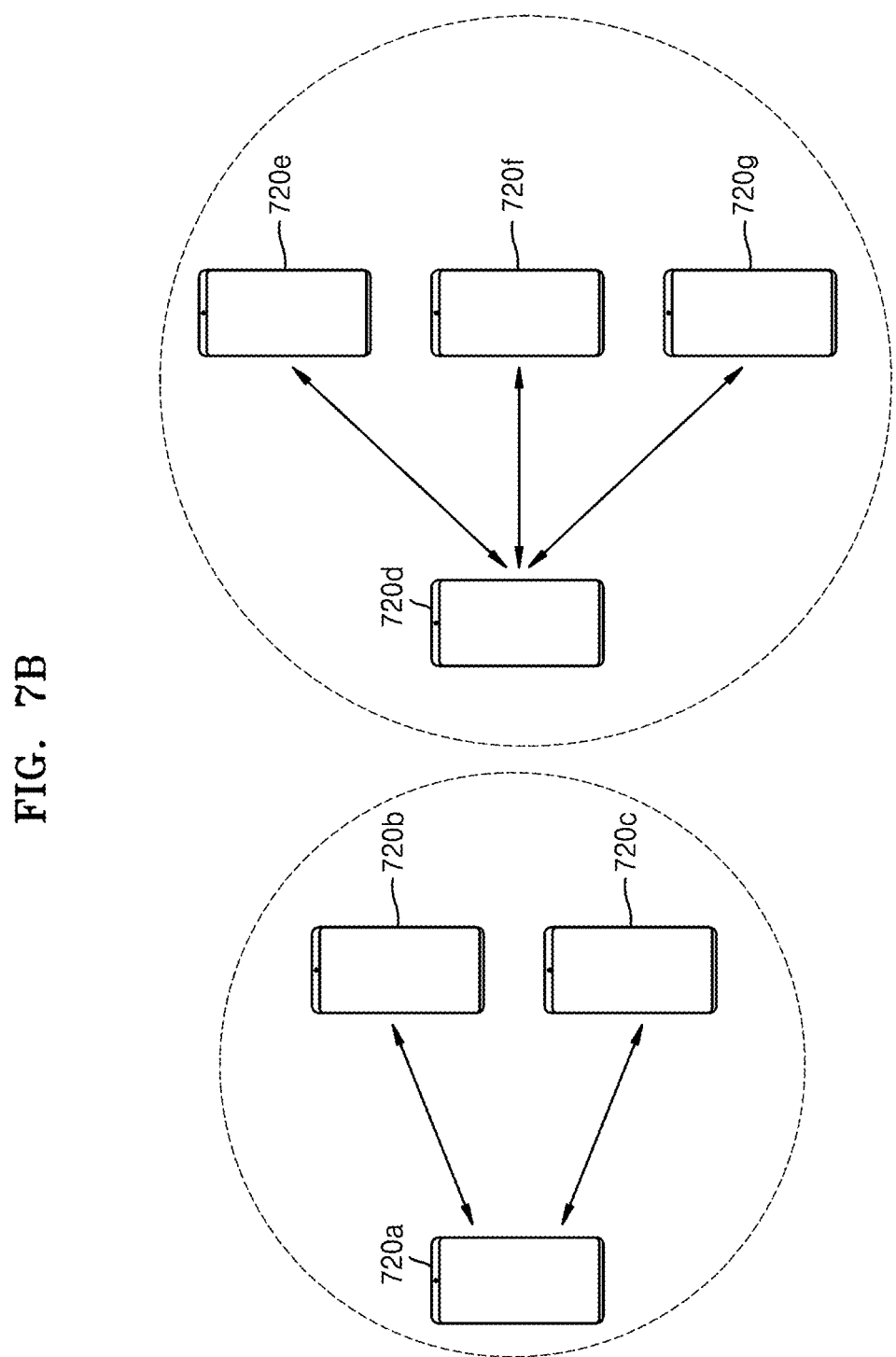

FIGS. 7A and 7B illustrate examples of a transmission method of sidelink communication in a wireless communication system, according to various embodiments of the disclosure. FIG. 7A illustrates a unicast method and FIG. 7B illustrates a groupcast method.

As shown in FIG. 7A, a transmission terminal 720a and a reception terminal 720b may perform communication in a one-on-one manner. A transmission method shown in FIG. 7A may be referred to as unicast communication. As shown in FIG. 7B, transmission terminal 720a or 720d and reception terminals 720b 720c, 720e, 720f, and 720g may perform communication in a one-to-many manner. A transmission method shown in FIG. 7B may be referred to as a groupcast or multicast communication. In FIG. 7B, a first terminal 720a, a second terminal 720b, and a third terminal 720c may form one group, and terminals (the first through third terminals 720a through 720c) in the group may perform groupcast communication. A fourth terminal 720d, a fifth terminal 720e, a sixth terminal 720f, and a seventh terminal 720g may form another group, and terminals (the fourth through seventh terminals 720d through 720g) in the group may perform groupcast communication. A terminal may perform groupcast communication within a group to which it belongs, or may perform unicast, groupcast, or broadcast communication with at least one other terminal in different groups. In FIG. 7B, two groups are illustrated, but the disclosure is not limited thereto and may be applied even when a greater number of groups are formed.

Meanwhile, although not shown in FIG. 7A or 7B, sidelink terminals may perform broadcast communication. The broadcast communication indicates a method in which data and control information transmitted by a sidelink transmission terminal via a sidelink are received by all sidelink terminals. For example, in FIG. 7B, when the first terminal 720a is a transmission terminal, remaining terminals 720b through 720g may receive data and control information transmitted by the first terminal 720a.

The sidelink unicast communication, groupcast communication, and broadcast communication described above may be supported in an in-coverage scenario, a partial-coverage scenario, or out-of-coverage scenario.

Unlike an LTE sidelink, an NR sidelink may consider support for a transmission type in which a vehicle terminal transmits data only to a specific terminal via unicast, and a transmission type in which a vehicle terminal transmits data to a plurality of specific terminals via groupcast. For example, when a service scenario such as platooning that is a technology of grouping and moving two or more vehicles in a form of a platoon by connecting the two or more vehicles via one network is considered, such unicast and group cast technologies may be useful. In particular, unicast communication may be used for a leader terminal of a group connected via platooning to control one specific terminal, and groupcast communication may be used for the leader terminal to simultaneously control a group including a plurality of specific terminals.

A base station or a terminal may perform resource allocation for sidelink communication (i.e., V2X). The resource allocation for sidelink transmission may be performed with a resource pool defined in time and frequency domains. The resource pool may be configured within a bandwidth part (BWP) in the frequency domain. In detail, following methods may be used for the resource allocation.

(1) Mode 1 Resource Allocation-Scheduled Resource Allocation

The scheduled resource allocation is a method by which a base station allocates a resource used for sidelink transmission via a scheduling method dedicated to RRC-connected terminals. The base station may allocate a resource to a terminal within coverage. The base station may transmit resource allocation information to a transmission terminal for sidelink transmission. In other words, the base station may schedule a resource for sidelink transmission and transmit a scheduling result to the terminal. The scheduled resource allocation method may be effective in interference management and management of a resource pool (dynamic allocation and/or semi-persistence transmission) because the base station is able to manage resources of a sidelink. When there is data to be transmitted to other terminal(s), an RRC connected mode terminal may transmit information notifying the base station that there is the data to be transmitted to the other terminal(s) by using an RRC message or a media access control (MAC) control element (CE). For example, the RRC message transmitted by the terminal to the base station may be a sidelink terminal information (SidelinkUE-Information) or terminal assistance information (UEAssistanceInformation) message, and the MAC CE may be buffer status report (BSR) MAC CE including at least one of an indicator indicating BSR for V2X communication and information about a size of data buffered for sidelink communication, or a scheduling request (SR).

(2) Mode 2 Resource Allocation—Terminal (UE) Autonomous Resource Selection

Secondly, the UE autonomous resource selection is a method of providing, to a terminal, a sidelink transmission/reception resource pool for V2X via system information, an RRC message (for example, an RRC reconfiguration message or PC5-RRC message), or pre-configuration information, and selecting, by the terminal, a resource pool and a resource according to a determined rule. The UE autonomous resource selection may correspond to one or a plurality of following resource allocation methods.

>A UE autonomously selects a sidelink resource for transmission.

>A UE assists sidelink resource selection for other UEs.

>A UE is configured with NR configured grant for sidelink transmission.

>A UE schedules sidelink transmission of other UEs.

>A UE autonomous resource selection method may include zone mapping, sensing-based resource selection, and random selection.

In addition, even when the terminal is present in coverage of a base station, resource allocation or resource selection may be unable to be performed in scheduled resource allocation or a UE autonomous resource selection mode. In this case, the terminal may perform V2X sidelink communication via a preconfigured sidelink transmission/reception resource pool (reconfiguration resource pool) or a sidelink transmission/reception resource pool configured for an exceptional situation (exceptional resource pool).

Also, when terminals for V2X communication are present outside the coverage of the base station, the terminal may perform V2X sidelink communication via a pre-configured sidelink transmission/reception resource pool.

An SLRB configuration and an SLRB for transmitting a sidelink flow or a packet are mapped to a sidelink (SL) logical channel (LC), and the SL LC may be mapped to an SL LC group (LCG). The SLRB configuration and the SLRB may be distinguished by a combination of a source index, a destination index, a cast type, a QoS flow identifier (QFI)/ProSe flow identifier or PC5 flow identifier (PFI), and priority.

According to an embodiment of the disclosure, an authenticated terminal that supports a sidelink communication function may determine PDCP out-of-order delivery support capability or PDCP in-order delivery support capability to support out-of-order delivery or in-order delivery of a sidelink PDCP layer.

The sidelink PDCP layer out-of-order delivery support capability or sidelink PDCP layer in-order delivery support capability of the terminal may be reported to a network via signaling between the terminal and a base station. The sidelink PDCP layer out-of-order delivery support capability or sidelink PDCP layer in-order delivery support capability of the terminal may be exchanged via PC5 RRC signaling between terminals. The PC5 RRC signaling between the terminals described above may be applied when PC5 unicast-based data transmission/reception is performed.

A PC5 PDCP out-of-order delivery capability exchange method according to various embodiments of the disclosure will be described in detail.

(1) PC5 PDCP Out-of-Order Delivery Capability Information Signaling of Terminal

When a base station is able to support PC5 communication and a terminal is able to support the PC5 communication and is authenticated, PC5 UE capability information may be exchanged with the base station when the terminal is connected to the base station. The PC5 UE capability information may include PDCP out-of-order delivery capability information. Here, the terminal may perform a function of the transmission terminal or a reception terminal.

Even when the terminal and the base station are connected to each other, there may be a need for a method of exchanging PDCP out-of-order delivery capability information between two terminals that are to perform direct communication through a PC5 interface. PDCP out-of-order delivery information exchange between two terminals may be supported via PC5 unicast capable of using PC5 RRC or PC5-S signaling. Regarding PC5 communication incapable of using PC5 RRC or PC5-S signaling between two terminals, it is difficult to exchange PDCP out-of-order delivery capability between the two terminals, and thus there is a need for a method of configuring support of PDCP out-of-order delivery, based on information shared between the two terminals.

A standard for configuring the PDCP out-of-order delivery capability information may include various examples shown in Table 1 below. However, it is obvious that the standard for configuring the PDCP out-of-order delivery capability information is not limited to the examples of Table 1.

TABLE 1

(1) Capability information may be configured for a terminal.
(2) Capability information may be configured for a V2X RAT supportable by a terminal. For example, NR V2X is able to support out-of-order delivery and LTE V2X is unable to support out-of-order delivery.
(3) Capability information may be configured for a destination identifier supportable by a terminal. For example, a destination identifier 1 is able to support out-of-order delivery and a destination identifier 10 is unable to support out-of-order delivery.
(4) Capability information may be configured for a PC5 cast type (for example, unicast, groupcast, or broadcast) supportable by a terminal. For example, out-of-order delivery is supportable for PC5 unicast and is not supportable for PC5 groupcast or PC5 broadcast.
(5) Capability information may be configured for PQI supportable by a terminal. For example, out-of-order delivery is supportable for PQI 1 to PQI 5 and is not supportable for PQI 6 to PQI 10.
(6) Capability information may be configured for a resource type (for example, GBR, non-GBR, or delay critical GBR) supportable by a terminal. For example, out-of-order delivery is supportable for delay critical GBR or non-GBR and is not supportable for GBR.
(7) Capability information may follow a regional configuration. A terminal configured in a region A where PC5 communication is operated is able to support out-of-delivery, and a terminal configured in a region B is unable to support out-of-delivery.

(2) PDCP Out-of-Order Delivery Support in PC5 Unicast Communication

According to an embodiment, in the PC5 unicast communication, PDCP out-of-order delivery capability information may be exchanged via UE capability information exchange of PC5 RRC signaling between two terminals. In this case, PDCP out-of-order delivery capability may be configured for at least one of a terminal, pro se QoS information (PQI), or a resource type.

According to an embodiment, in the PC5 unicast communication, a PDCP out-of-order delivery function is a function performed by a reception terminal, and thus the PDCP out-of-order delivery capability may be configured based on capability of the reception terminal. In this case, the PDCP out-of-order delivery capability may be configured for at least one of the reception terminal, a PQI supported by the reception terminal, or a resource type supported by the reception terminal.

(3) PDCP Out-of-Order Delivery Support in PC5 Groupcast Communication

In the PC5 groupcast communication, a terminal may determine whether PDCP out-of-order delivery is supported, according to the standard of Table 1. The terminal capable of performing the PC5 groupcast communication may support the PDCP out-of-order delivery when the standard of Table 1 is satisfied. The terminal may configure the PDCP out-of-order delivery without a separate capability exchange procedure, when the standard of Table 1 is satisfied.

(4) PDCP Out-of-Order Delivery Support in PC5 Broadcast Communication

In the PC5 broadcast communication, a PDCP out-of-order delivery support method may be identically applied as PC5 groupcast communication. A terminal capable of performing the PC5 broadcast communication may support the PDCP out-of-order delivery when the standard of Table 1 is satisfied. The terminal may configure the PDCP out-of-order delivery without a separate capability exchange procedure, when the standard of Table 1 is satisfied.

(5) An out-of-coverage terminal may operate according to PC5 unicast, PC5 groupcast, and PC5 broadcast of (1) to (4). According to another embodiment, the out-of-coverage terminal may support out-of-order delivery only for PC5 unicast communication. According to another embodiment, the out-of-coverage terminal may support out-of-order delivery for all cast types.

According to various embodiments, when it is determined that PC5 PDCP out-of-order delivery capability is supported, a method by which a terminal obtains PC5 PDCP out-of-order delivery configuration information is as follows. PDCP out-of-order delivery is configured only for a reception terminal, but when the PDCP out-of-order delivery is configured, header compression is not configured, and thus the PDCP out-of-order delivery configuration information may be transmitted also to a transmission terminal. The PDCP out-of-order delivery configuration information may be obtained by a terminal from SLRB configuration information transmitted by a base station via RRC dedicated or SIB signaling. An out-of-coverage terminal may obtain the PDCP out-of-order delivery configuration information through preconfigured SLRB configuration information. The SLRB configuration information including an out-of-order delivery configuration may indicate not to configure header compression.

Regarding PC5 unicast communication, when it is determined that two terminals or a reception terminal support PDCP out-of-order delivery, the PDCP out-of-order delivery may be configured via SLRB configuration information exchange of PC5 RRC signaling. The PDCP out-of-order delivery may be configured for at least one of a PQI, an SLRB, a PC5 flow, or a resource type. Such PDCP out-of-order delivery configuration information may be obtained by the transmission terminal via base station signaling or pre-configured information. According to another embodiment, the PDCP out-of-order delivery configuration information may be obtained by the reception terminal supporting out-of-order delivery capability, via base station signaling or preconfigured information. The transmission terminal or reception terminal that has obtained the PDCP out-of-order delivery configuration information may transmit the PDCP out-of-order delivery configuration information to a counterpart terminal via PC5 RRC signaling. When PDCP out-of-order delivery is configured, header compression may not be configured for an SLRB or PC5 flow to which the PDCP out-of-order delivery is to be applied. The transmission terminal or reception terminal that has obtained the PDCP out-of-order delivery configuration information may determine that PDCP out-of-order delivery configuration is valid until the PC5 flow or SLRB is released.

According to another embodiment, the PDCP out-of-order delivery configuration information may be directly configured by the transmission terminal. When header compression is configured to be not applied for the SL flow or SLRB (for example, when a header compression parameter value is configured to NULL or non-used), the transmission terminal may configure the PDCP out-of-order delivery. When the header compression is configured to be applied for the SL flow or SLRB (for example, when the header compression parameter value is not configured to NULL or non-used), the transmission terminal is unable to configure the PDCP out-of-order delivery.

According to another embodiment, the PDCP out-of-order delivery configuration information may be directly configured by the reception terminal. When the header compression is configured to be not applied for the SL flow or SLRB (for example, when a header compression parameter value is configured to NULL or non-used), the reception terminal may configure the PDCP out-of-order delivery. When the header compression is configured to be applied for the SL flow or SLRB (for example, when the header compression parameter value is not configured to NULL or non-used), the reception terminal is unable to configure the PDCP out-of-order delivery.

Figure 8A:
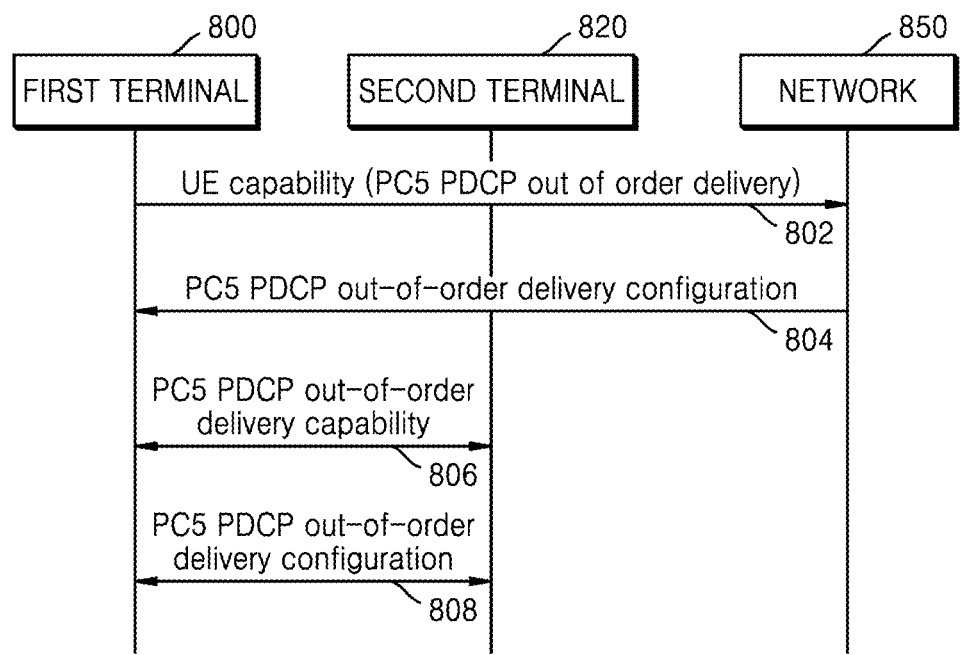
FIGS. 8A through 8C illustrate signal flows between a base station and a terminal supporting PC5 packet data convergence protocol (PDCP) out-of-order delivery, according to various embodiments of the disclosure.
Figure 8B:
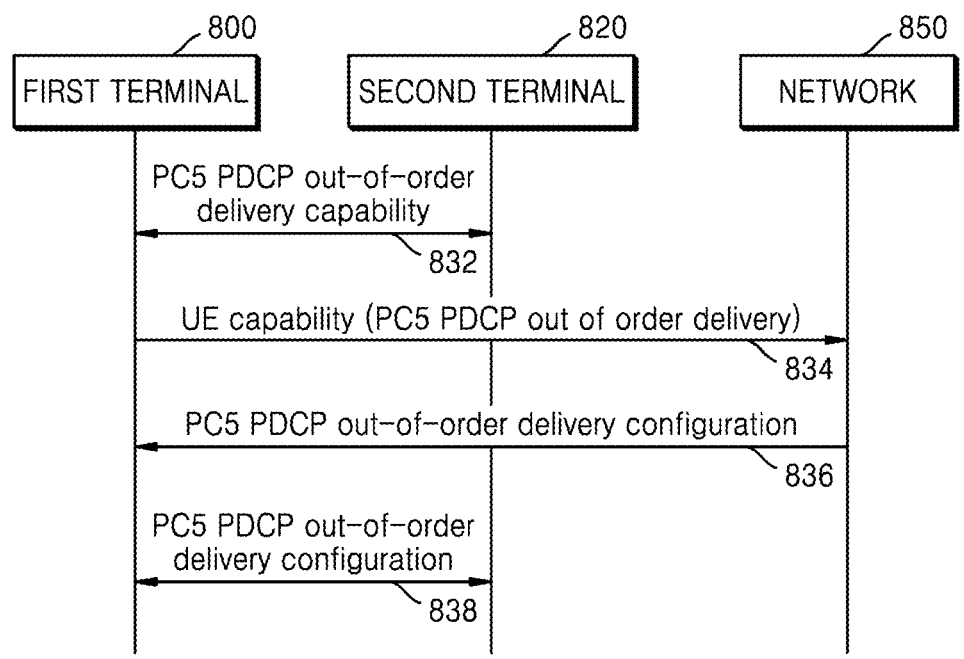
Figure 8C:
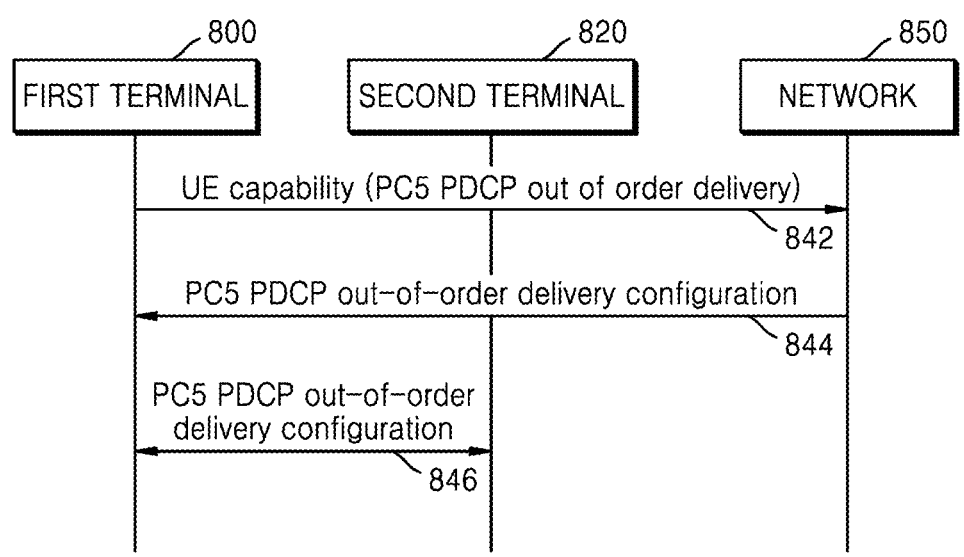

FIGS. 8A through 8C illustrate signal flows between a base station and a terminal supporting PC5 PDCP out-of-order delivery, according to various embodiments of the disclosure.

Referring to FIG. 8A, a first terminal 800 is connected to a network/base station 850 supporting PC5 communication. The first terminal 800 may transmit UE capability information to the base station 850 in operation 802, and according to an embodiment of the disclosure, the UE capability information may include PC5 PDCP out-of-order delivery capability information. The base station 850 may transmit PC5 PDCP out-of-order delivery configuration information to the first terminal 800 in operation 804, based on the PC5 PDCP out-of-order delivery capability information of the first terminal 800. When PC5 unicast communication is performed, the first terminal 800 may exchange the PC5 PDCP out-of-order delivery capability information with a counterpart second terminal 820 in operation 806. In operation 808, the first terminal 800 and the second terminal 820 may exchange the PC5 PDCP out-of-order delivery configuration information. The PC5 PDCP out-of-order delivery configuration information of operation 808 may be information based on the configuration information obtained from the base station 850 in operation 804.

Referring to FIG. 8B, the first terminal 800 that is to perform the PC5 unicast communication may exchange the PC5 PDCP out-of-order delivery capability information with the counterpart second terminal 820 in operation 832. When there is a connection with the network/base station 850 supporting PC5 communication, the first terminal 800 may report the base station 850 of information including the PC5 PDCP out-of-order delivery capability information in operation 834. The base station 850 may transmit the PC5 PDCP out-of-order delivery configuration information to the first terminal 800 in operation 836, based on PC5 PDCP out-of-order delivery capability. In operation 838, the first terminal 800 and the second terminal 820 may exchange the PC5 PDCP out-of-order delivery configuration information. The PC5 PDCP out-of-order delivery configuration information of operation 838 may be information based on the PC5 PDCP out-of-order delivery configuration information obtained from the base station 850 in operation 836.

The procedure of FIG. 8B may support an operation of reporting the PC5 PDCP out-of-order delivery capability information to the base station 850 for a PC5 SLRB configuration (including the PDCP out-of-order delivery configuration), based on the out-of-delivery capability information, after a transmission terminal and a reception terminal exchange the PDCP out-of-order delivery capability information via PC5 RRC signaling.

Referring to FIG. 8C, the first terminal 800 is connected to the network/base station 850 supporting the PC5 communication. The first terminal 800 may transmit the UE capability information to the base station 850 in operation 842, and according to an embodiment of the disclosure, the UE capability information may include the PC5 PDCP out-of-order delivery capability information. The base station 850 may transmit the PC5 PDCP out-of-order delivery configuration information to the first terminal 800 in operation 844, based on the PC5 PDCP out-of-order delivery capability information of the first terminal 800. When the PC5 unicast communication is performed, the first terminal 800 may exchange the PC5 PDCP out-of-order delivery configuration information with the counterpart second terminal 820 in operation 846. The PC5 PDCP out-of-order delivery configuration information of operation 846 may be information based on the PC5 PDCP out-of-order delivery configuration information obtained from the base station 850 in operation 844. The procedure of FIG. 8C may correspond to a scenario in which a reception terminal obtains configuration information based on PC5 PDCP out-of-order delivery support capability.

The PC5 PDCP out-of-order delivery capability information of a terminal, according to an embodiment, is as Table 2 below.

TABLE 2

PDCP-parameters
outOfOrderDelivery (supported)

The PC5 PDCP out-of-order delivery configuration information of a terminal, according to an embodiment, is as Table 3 below.

TABLE 3

SidelinkRadioBearer_PDCP-Config
outOfOrderDelivery (true)

outOfOrderDelivery indicates whether or not outOfOrderDelivery specified in TS 38.323 is configured. This field should be either always present or always absent, after a radio bearer is established. (outOfOrderDelivery indicates whether or not outOfOrderDelivery specified in TS 38.323 is configured. This field should be either always present or always absent, after the radio bearer is established.)

No header compression is configured when outOfOrderDelivery is configured. (No header compression is configured if outOfOrderDelivery is configured.)

The procedures of FIGS. 8A through 8C are described as if a terminal is connected to a base station, but when the terminal is in an RRC_idle state or RRC_inactive state or is in an out-of-coverage state, PC5 PDCP out-of-order delivery configuration information may be obtained via pre-configured information or V2X SIB transmitted by the base station.

According to an embodiment of the disclosure, a PDCP out-of-order delivery configuration for a terminal supporting PDCP out-of-order delivery capability for PC5 communication may be determined based on a PQI profile. A configuration standard may correspond to at least one of followings. The configuration standard may be applied to PQI of an SLRB or PQI of a destination identifier.

a) Latency of PQI is shorter than a reference time.
b) A packet delay budget (PDB) of PQI is smaller than a reference value.
c) A packet size of PQI is smaller than a reference value.
d) An averaging window of PQI is smaller than a reference value.

In PC5 groupcast or PC5 broadcast, PC5 PDCP out-of-order delivery support may be determined based on information such as Table 1, without a signal exchange between two terminals for PC5 PDCP out-of-order delivery capability. A terminal capable of supporting PC5 PDCP out-of-order delivery may obtain PC5 PDCP out-of-order delivery configuration information by obtaining SLRB configuration information regarding the PC5 groupcast or PC5 broadcast. For example, the terminal may obtain the PC5 PDCP out-of-order delivery configuration information from an SLRB configuration configured for at least one of a destination identifier, an SLRB identifier, PQI, and PFI. Upon receiving a packet belonging to an SLRB configured for PDCP out-of-order delivery, a reception terminal may transmit the same to a upper layer.

According to an embodiment, the SLRB configuration including the PC5 PDCP out-of-order delivery is as Table 4 below.

TABLE 41

- SLRB Identity
- Destination Identity
- Cast type (optional)
- Mapped QoS flow (SQI/PQI/PFI)
- Transmission range (optional)
- LogicalChannelIdentity
- outOfOrderDelivery (PDCP)
- headerCompression
...

Information of Table 4 may be included in at least one of access stratum (AS) configuration signaling exchanged between terminals via PC5 RRC signaling, RRC dedicated/SIB signaling transmitted by a base station, and pre-configured information. When the PC5 PDCP out-of-order delivery configuration information is not included or is configured as false, the reception terminal may perform PDCP in-order delivery for the received packet. In the PC5 groupcast or PC5 broadcast, the reception terminal may determine whether the PC5 PDCP out-of-order delivery is configured by mapping information included in at least one signaling from among sidelink control information (SCI), an MAC header, an MAC subheader, a radio link control (RLC) header, an RLC control protocol data unit (PDU), a PDCP header, a PDCP control PDU, and a service data adaption protocol (SDAP) control PDU to at least one piece of information from among an SLRB identifier, a destination identifier, a mapped QoS low, a logical channel identifier, a cast type, and a transmission range of the SLRB configuration of Table 4.

According to an embodiment, the terminal may obtain the PDCP out-of-order delivery configuration information indicated by at least one of the SCI, MAC header, MAC subheader, MAC CE, RLC header, RLC control PDU, PDCP header, PDCP control PDU, and SDAP control PDU, which correspond to the received packet. Upon receiving the packet belonging to the SLRB configured for the PDCP out-of-order delivery, the reception terminal may transmit the same to the upper layer.

Figure 8D:
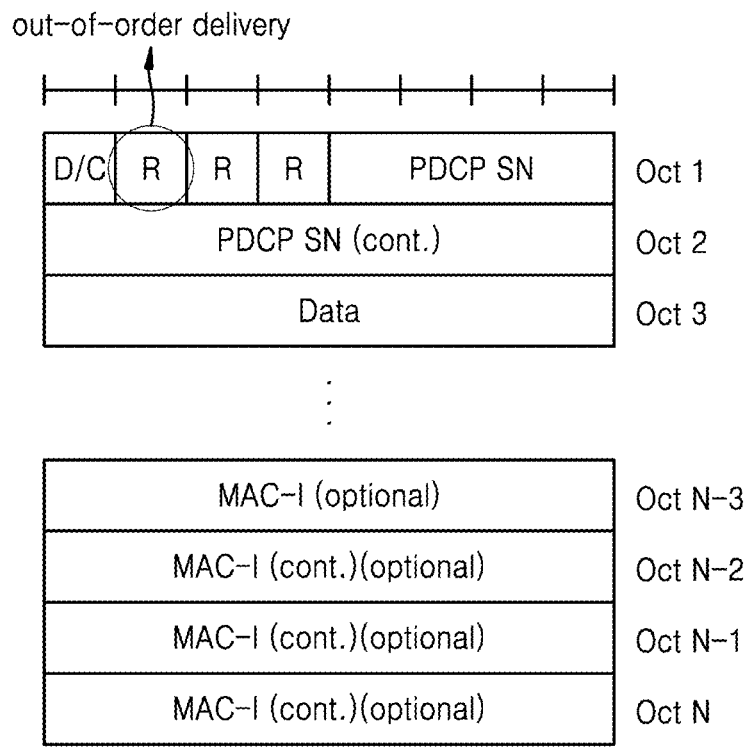
FIG. 8D illustrates an example of a PDCP data protocol data unit (PDU) including reserved bits in a header used as an out-of-order delivery indicator according to various embodiments of the disclosure.

For example, a case in which one of reserved bits that are not used in a header of the PDCP data PDU is used as an out-of-order delivery indicator will be described and is illustrated in FIG. 8D.

When an out-of-order delivery field is configured to be 0, in-order delivery may be indicated, and when the out-of-order delivery field is configured to be 1, out-of-order delivery may be indicated. A terminal that has received a PDCP data PDU in which out-of-delivery is configured to be 1 may determine that a corresponding packet is transmittable out-of-order, and transmit a PDCP data SDU of the packet to a upper layer. When the out-of-order delivery field is configured to be 1, a reception terminal may determine that a packet received together with an out-of-order delivery indicator and packets received afterwards are transmittable out-of-order. The out-of-order delivery may be applied to packets belonging to an SLRB in which the corresponding packet is transmitted. Here, the SLRB in which the corresponding packet is transmitted may denote an SLRB mapped to a QoS flow of the corresponding packet. When the out-of-delivery indicator is not received, the terminal may perform in-order delivery for a PDCP packet corresponding to the SLRB. An out-of-order delivery configuration may be valid until the SLRB is released.

According to an embodiment, a PDCP control PDU for indicating out-of-order delivery may be separately defined. Such a PDCP control PDU may include at least one piece of information from among out-of-delivery and an SLRB identifier where a corresponding packet is transmitted. Upon receiving the PDCP control PDU for indicating the out-of-order delivery, a terminal may recognize that out-of-order delivery is able to be performed on a PDCP packet transmitted via a corresponding SLRB. When the PDCP control PDU for indicating the out-of-order delivery is not received, the terminal may perform in-order delivery on the PDCP packet transmitted via the corresponding SLRB. The terminal may determine that an out-of-order delivery configuration is valid until the SLRB is released.

According to an embodiment, an MAC subheader may be defined for indicating PDCP out-of-order delivery. Such an MAC subheader may include at least one piece of information from among out-of-delivery and an SLRB identifier where a corresponding packet is transmitted. Upon receiving the MAC subheader for indicating the out-of-order delivery, a terminal may recognize that out-of-order delivery is able to be performed on a PDCP packet transmitted via a corresponding SLRB. When the MAC subheader for indicating the out-of-order delivery is not received, the terminal may perform in-order delivery on the PDCP packet transmitted via the corresponding SLRB. The terminal may determine that an out-of-order delivery configuration is valid until the SLRB is released.

Figure 8E:
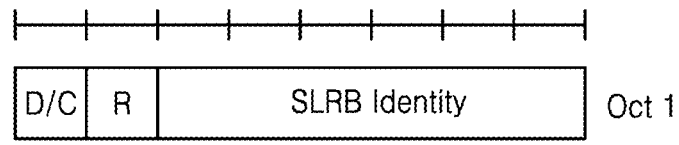
FIG. 8E illustrates an example of a service data adaption protocol (SDAP) control PDU according to various embodiments of the disclosure.

According to an embodiment, an SDAP control PDU for indicating PDCP out-of-order delivery may be defined and is illustrated in FIG. 8E.

The SDAP control PDU may include at least one piece of information from among out-of-delivery and an SLRB identifier where a corresponding packet is transmitted. Upon receiving the SDAP control PDU for indicating the out-of-order delivery, a terminal may recognize that out-of-order delivery is able to be performed on a PDCP packet transmitted via an SLRB. When the SDAP control PDU for indicating the out-of-order delivery is not received, the terminal may perform in-order delivery on the PDCP packet transmitted via the corresponding SLRB. The terminal may determine that an out-of-order delivery configuration is valid until the SLRB is released.

Hereinabove, various methods of separately configuring an out-of-order delivery indicator are described. However, an embodiment is not limited thereto, and it is obvious that a PC5 PDCP in-order delivery indicator may be separately configured and transmitted via a PC5 interface. In other words, a terminal may separately operate the PC5 PDCP in-order delivery indicator and a PC5 PDCP out-of-order delivery indicator, and upon receiving the in-order delivery indicator and the out-of-order delivery indicator, a reception terminal may perform in-order delivery or out-of-order delivery on a PDCP packet transmitted through a corresponding SLRB, according to information of the indicator.

According to an embodiment, when at least one of an RLC control PDU, a PDCP control PDU, and an SDAP control PDU is used for indicating out-of-order delivery, an operation by which a reception terminal configures at least one of RLC, PDCP, and SDAP entities may be defined as Table 5 below. Reference information for determining, by the reception terminal, whether a reception (RX) entity is configured or whether a new RX entity is to be configured may be based on a received data PDU. A control PDU may not be considered as a reference for configuring an RX entity.

TABLE 7

RX entity establishment is triggered by the reception of first PDU where there is not yet a corresponding receiving entity.
• The PDU can be a data PDU.

According to an embodiment, when at least one of an RLC control PDU, a PDCP control PDU, and an SDAP control PDU is used for indicating out-of-order delivery, an operation by which a reception terminal configures at least one of RLC, PDCP, and SDAP entities may be defined as Table 6 below. When an RX entity is configured, a control PDU and/or a data PDU may be used.

TABLE 8

RX entity establishment is triggered by the reception of first PDU where there is not yet a corresponding receiving entity.
• The PDU can be either data PDU or a control PDU for out-of-order delivery.

Here, when a terminal separately operates a control PDU for in-order delivery, the control PDU for in-order delivery may also be considered together as a PDU used as a reference for an RX entity configuration.

According to an embodiment of the disclosure, when an RLC control PDU is used for out-of-order delivery, an operation by which a reception terminal manages a sequence number in an RX entity is as follows. The operation may be applied to the RX entity when the reception terminal operates in an RLC unacknowledged mode (UM).

a) RX_Next_Reassembly (UM Receive State Variable)

RX_Next_Reassembly, i.e., this state variable, holds a value of an earliest sequence number (SN) that is still considered for reassembly. The RX_Next_Reassembly is initially set to 0. For groupcast and broadcast of NR sidelink communication, the RX_Next_Reassembly is initially set to an SN of a first received UM data (UMD) PDU with an SN associated. (This state variable holds the value of the earliest SN that is still considered for reassembly. It is initially set to 0. For groupcast and broadcast of NR sidelink communications, it is initially set to the SN of the first received UMD PDU with an SN associated.)

In other words, an RLC control PDU for indicating out-of-order delivery may not include SN information, and thus a terminal may not consider the RLC control PDU in an SN-related variable.

NR sidelink communication, the RX_Next_Highest is initially set to an SN of a first received UMD PDU with an SN associated. (This state variable holds the value of the SN following the SN of the UMD PDU with the highest SN among received UMD PDUs. It serves as the higher edge of the reassembly window. It is initially set to 0. For groupcast and broadcast of NR sidelink communications, it is initially set to the SN of the first received UMD PDU with an SN associated.)

In other words, an RLC control PDU for indicating out-of-order delivery may not include SN information, and thus a terminal may not consider the RLC control PDU in an SN-related variable.

Figure 9:
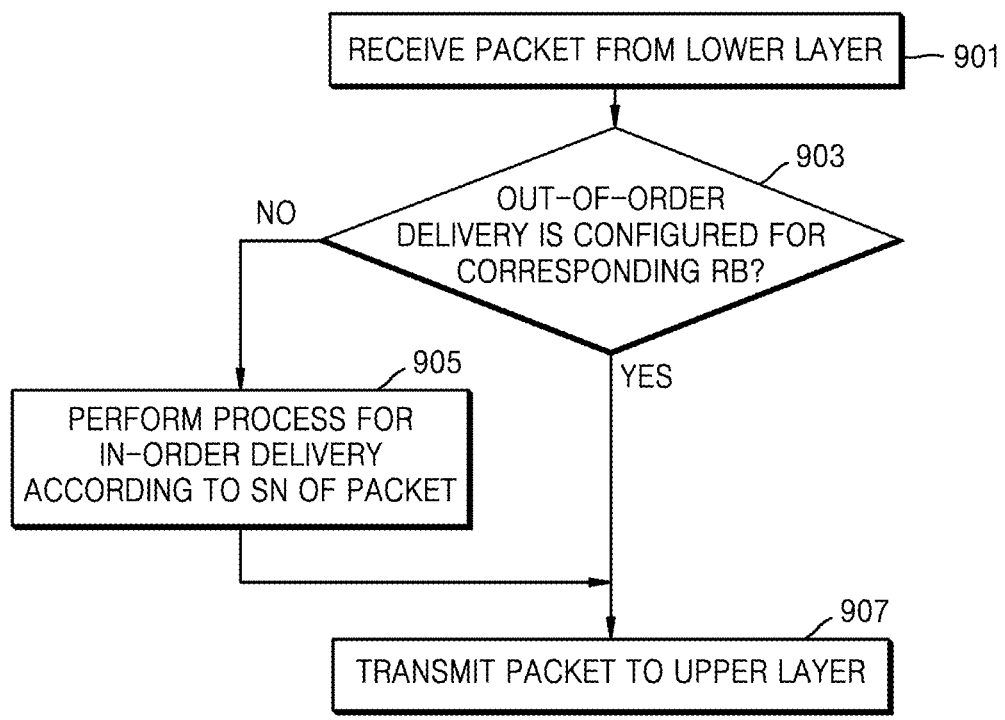
FIG. 9 illustrates operations by which a reception terminal processes PDCP out-of-order delivery, according to various embodiments of the disclosure.

FIG. 9 illustrates operations by which a reception terminal processes PDCP out-of-order delivery, according to various embodiments of the disclosure.

In operation 901, a terminal may receive a packet (PDCP PDU) transmitted from a lower layer. The terminal may determine, in operation 903, whether PDCP out-of-order delivery is configured for an SLRB in which the received packet is transmitted. Here, the SLRB in which the packet is transmitted may denote an SLRB mapped to a QoS flow of the packet. When the PDCP out-of-order delivery is configured according to the determination of operation 903, the terminal may transmit a PDCP SDU of the packet to a upper layer in operation 907. When the PDCP out-of-order delivery is not configured according to the determination of operation 903, the terminal may perform a process for in-order delivery according to an SN of the packet in operation 905. For example, when a PDCP PDU corresponding to an SN lower than the packet has not yet received, the packet may be stored in a buffer. When the packet is a packet corresponding to a lowest SN to be transmitted to the upper layer, a PDCP SDU of the packet may be transmitted to the upper layer in operation 907.

Such operations may be performed as Table 7.

TABLE 9

If the received PDCP Data PDU with COUNT value = RCVD_COUNT is not discarded above, the receiving PDCP entity shall:
- store the resulting PDCP SDU in the reception buffer;
- if RCVD_COUNT >= RX_NEXT:
  - update RX_NEXT to RCVD_COUNT + 1.
- if outOfOrderDelivery is configured:
  - deliver the resulting PDCP SDU to upper layers.

b) Rx_Timer_Trigger (UM t-Reassembly State Variable)

Rx_Timer_Trigger, i.e., this state variable, holds a value of SN following an SN which triggered t-Reassembly. (This state variable holds the value of the SN following the SN which triggered t-Reassembly.)

c) RX_Next_Highest (UM Receive State Variable)

RX_Next_Highest, i.e., this state variable, holds a value of SN following an SN of a UMD PDU with a highest SN among received UMD PDUs. The RX_Next_Highest serves as a higher edge of a reassembly window. The RX_Next_Highest is initially set to 0. For groupcast and broadcast of FIG. 10 illustrates operations by which a transmission terminal processes a configuration of PDCP out-of-order delivery, according to various embodiments of the disclosure.

Figure 10:
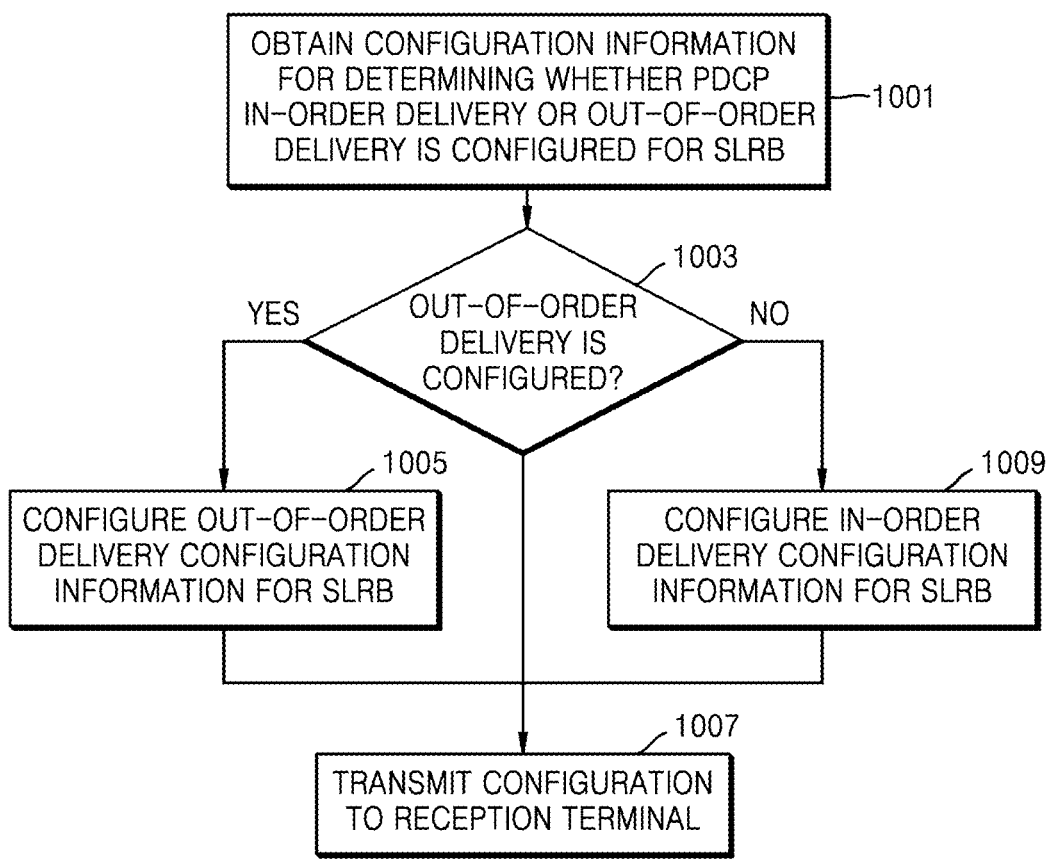
FIG. 10 illustrates operations by which a transmission terminal processes a configuration of PDCP out-of-order delivery, according to various embodiments of the disclosure.

Referring to FIG. 10, a terminal may obtain configuration information for determining whether PDCP in-order delivery or out-of-order delivery is configured for an SLRB, in operation 1001. According to an embodiment, the configuration information for determining whether the PDCP in-order delivery or out-of-order delivery is configured may be obtained via at least one of signaling transmitted by a base station or pre-configured information. According to an embodiment, when PDCP out-of-order delivery is configured according to the signaling transmitted by the base station or the pre-configured information, the terminal may determine that that header compression is not configured (a headercompression parameter value of PDCP-config is configured to NULL or not used). According to an embodiment, the configuration information for determining whether the PDCP in-order delivery or out-of-order delivery is configured may be directly configured by the terminal. When the terminal configures the PDCP out-of-order delivery, the header compression may not be configured (the headercompression parameter value of PDCP config is configured to be NULL or not used). Also, the configuration information for determining whether the PDCP in-order delivery or out-of-order delivery is configured may be obtained according to the configuration standard of Table 1. The configuration information for determining whether the PDCP in-order delivery or out-of-order delivery is configured may be configured to be at least one of Table 3 and Table 4. The configuration information for determining whether the PDCP in-order delivery or out-of-order delivery is configured may be determined when the SLRB is configured. When the terminal configures PDCP out-of-order delivery for one SLRB but header compression of PDCP config for the SLRB is not configured, the terminal may configure PDCP in-order delivery or PDCP out-of-order delivery for the SLRB. When the terminal configures PDCP out-of-order delivery for one SLRB and header compression of PDCP config for the SLRB is configured, the terminal may configure PDCP in-order delivery for the SLRB.

In operation 1003, the terminal may determine whether out-of-delivery is configured for the SLRB. When it is determined that the out-of-order delivery is configured for the SLRB as a result of the determination in operation 1003, the terminal may configure out-of-order delivery configuration information for the SLRB in operation 1005, and transmit the out-of-order delivery configuration information to a reception terminal in operation 1007. As described above, at least one of PC5 RRC signaling, SCI, MAC header, MAC subheader, RLC header, RLC control PDU, PDCP header, PDCP control PDU, and SDAP control PDU may be applied as a method of transmitting the out-of-order delivery configuration information to the reception terminal in operation 1007. A transmission terminal may determine that an out-of-order delivery configuration for the SLRB is applied until the SLRB is released. The transmission terminal may determine that header compression is not configured for the SLRB.

When it is determined that the in-order delivery is configured for the SLRB according to the determination in operation 1003, the terminal may configure in-order delivery configuration information for the SLRB in operation 1009, and transmit the in-order delivery configuration information to the reception terminal in operation 1007. According to an embodiment, the transmitting of the in-order delivery configuration information may include not transmitting the out-of-order delivery configuration information for the SLRB. According to an embodiment, the transmitting of the in-order delivery configuration information may include transmitting in-order delivery indication information via at least one signaling from among PC5 RRC, SCI, MAC header, MAC subheader, RLC header, RLC control PDU, PDCP header, PDCP control PDU, and SDAP control PDU, for the SLRB.

Figure 11A:
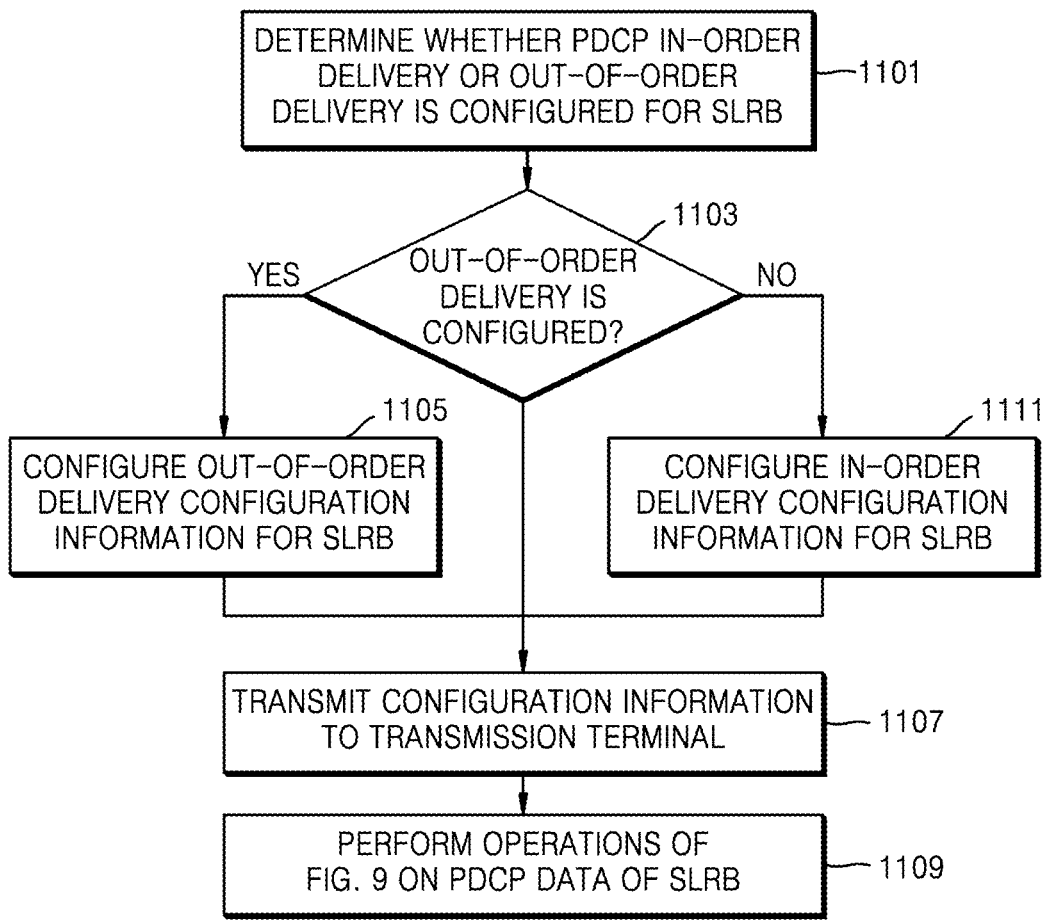
FIGS. 11A and 11B illustrate operations by which a reception terminal processes a configuration of PDCP out-of-order delivery, according to various embodiments of the disclosure.

FIG. 11A illustrates operations by which a reception terminal processes a configuration of PDCP out-of-order delivery, according to various embodiments of the disclosure.

Referring to FIG. 11A, a terminal may obtain configuration information for determining whether PDCP in-order delivery or out-of-order delivery is configured for an SLRB, in operation 1101.

According to an embodiment, the configuration information for determining whether the PDCP in-order delivery or out-of-order delivery is configured may be obtained via at least one of signaling transmitted by a base station or pre-configured information. Also, the configuration information for determining whether the PDCP in-order delivery or out-of-order delivery is configured may be obtained according to the configuration standard of Table 1. The configuration information for determining whether the PDCP in-order delivery or out-of-order delivery is configured may be configured to be at least one of Table 3 and Table 4. The configuration information for determining whether the PDCP in-order delivery or out-of-order delivery is configured may be determined when the SLRB is configured. Here, header compression may not be configured for the SLRB where out-of-order delivery is configured. For example, a case in which the header compression is not configured may include a case in which a headercompression parameter of PDCP-config of the SLRB is configured to be not used or NULL.

According to another embodiment, the terminal may directly configure the in-order delivery configuration or out-of-order delivery configuration information. Here, the terminal may determine a PDCP out-of-order delivery configuration or in-order delivery configuration, based on a sidelink flow and application information or QoS profile information corresponding to the SLRB. The configuration information for determining whether the PDCP in-order delivery or out-of-order delivery is configured may be obtained according to the configuration standard of Table 1. The configuration information for determining whether the PDCP in-order delivery or out-of-order delivery is configured may be configured to be at least one of Table 3 and Table 4. The configuration information for determining whether the PDCP in-order delivery or out-of-order delivery is configured may be determined when the SLRB is configured. When the terminal configures PDCP out-of-order delivery for one SLRB, the terminal may identify header compression configuration information for the SLRB and configure the PDCP out-of-order delivery for the SLRB when it is determined that header compression is not configured for the SLRB. For example, a case in which the header compression is not configured may include a case in which a headercompression parameter of PDCP-config of the SLRB is configured to be not used or NULL. The terminal may identify the header compression configuration information for the SLRB, and when it is determined that the header compression is configured for the SLRB, the terminal determines that PDCP in-order delivery is configurable for the SLRB and PDCP out-of-order delivery is not configurable for the SIRB.

In operation 1103, the terminal may determine whether out-of-delivery is configured for the SLRB. When it is determined that the out-of-order delivery is configured for the SLRB as a result of the determination in operation 1103, the terminal may configure out-of-order delivery configuration information for the SLRB in operation 1105, and transmit the out-of-order delivery configuration information to a transmission terminal in operation 1107. As described above, at least one of PC5 RRC signaling, SCI, MAC header, MAC subheader, RLC header, RLC control PDU, PDCP header, PDCP control PDU, and SDAP control PDU may be applied as a method of transmitting the out-of-order delivery configuration information to the transmission terminal in operation 1107. The reception terminal and the transmission terminal may determine that an out-of-order delivery configuration for the SLRB is applied until the SLRB is released. The transmission terminal that has received the configuration information in operation 1107 may determine that header compression is not configured because the reception terminal may perform the PDCP out-of-order delivery for the SLRB. In operation 1109, the reception terminal may perform the operations of FIG. 9 on PDCP data of the SLRB.

When it is determined that the in-order delivery is configured for the SLRB according to the determination in operation 1103, the terminal may configure in-order delivery configuration information for the SLRB in operation 1111, and transmit the in-order delivery configuration information to the transmission terminal in operation 1107. According to an embodiment, the transmitting of the in-order delivery configuration information may include not transmitting the out-of-order delivery configuration information for the SLRB. According to an embodiment, the transmitting of the in-order delivery configuration information may include transmitting in-order delivery indication information via at least one signaling from among PC5 RRC, SCI, MAC header, MAC subheader, RLC header, RLC control PDU, PDCP header, PDCP control PDU, and SDAP control PDU, for the SLRB. The transmission terminal that has received the configuration information in operation 1107 may determine that the reception terminal is able to perform PDCP in-order delivery for the SLRB. The transmission terminal may determine that PDCP header compression is applicable or not applicable for the SLRB. In operation 1109, the reception terminal may perform the operations of FIG. 9 on the PDCP data of the SLRB.

Figure 11B:
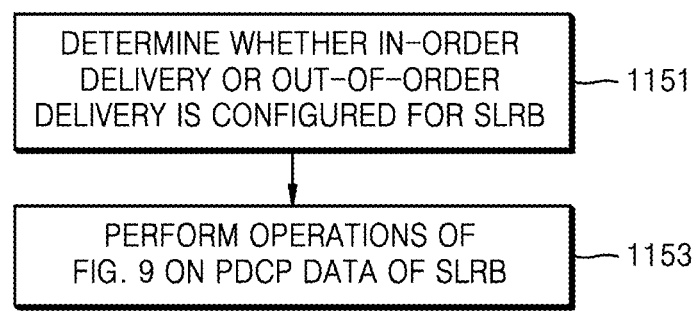

FIG. 11B illustrates operations by which a reception terminal processes a configuration of PDCP out-of-order delivery, according to various embodiments of the disclosure.

Referring to FIG. 11B, a reception terminal may determine whether PDCP in-order delivery or PDCP out-of-order delivery is configured for an SLRB, in operation 1151.

According to an embodiment of operation 1151, the reception terminal may obtain configuration information for determining whether the PDCP in-order delivery or out-of-order delivery is configured via at least one of signaling transmitted by a base station or pre-configured information. Also, the configuration information for determining whether the PDCP in-order delivery or out-of-order delivery is configured may be obtained according to the configuration standard of Table 1. The configuration information for determining whether the PDCP in-order delivery or out-of-order delivery is configured may be configured to be at least one of Table 3 and Table 4. The configuration information for determining whether the PDCP in-order delivery or out-of-order delivery is configured may be determined when the SLRB is configured. Here, header compression may not be configured for the SLRB where out-of-order delivery is configured. For example, a case in which the header compression is not configured may include a case in which a headercompression parameter of PDCP-config of the SLRB is configured to be not used or NULL.

According to another embodiment of operation 1151, the reception terminal may directly configure the in-order delivery configuration or out-of-order delivery configuration information. Here, the terminal may determine a PDCP out-of-order delivery configuration or in-order delivery configuration, based on a sidelink flow and application information or QoS profile information corresponding to the SLRB. The configuration information for determining whether the PDCP in-order delivery or out-of-order delivery is configured may be obtained according to the configuration standard of Table 1. The configuration information for determining whether the PDCP in-order delivery or out-of-order delivery is configured may be configured to be at least one of Table 3 and Table 4. The configuration information for determining whether the PDCP in-order delivery or out-of-order delivery is configured may be determined when the SLRB is configured. When the terminal configures PDCP out-of-order delivery for one SLRB, the terminal may identify header compression configuration information for the SLRB and configure the PDCP out-of-order delivery for the SLRB when it is determined that header compression is not configured for the SLRB. For example, a case in which the header compression is not configured may include a case in which a headercompression parameter of PDCP-config of the SLRB is configured to be not used or NULL. The terminal may identify the header compression configuration information for the SLRB, and when it is determined that the header compression is configured for the SLRB, the terminal determines that PDCP in-order delivery is configurable for the SLRB and PDCP out-of-order delivery is not configurable for the SLRB.

In operation 1153, the reception terminal may perform the operations of FIG. 9 on PDCP data of the SLRB according to the configuration of operation 1151.

According to an embodiment of the disclosure, an entity for configuring header compression of an SLRB, for example, a transmission terminal, a base station, or a network, may not change a header compression configuration until one SLRB is generated and released. In this case, when PDCP out-of-order delivery is configured for the SLRB, a reception terminal may apply the PDCP out-of-order delivery until the SLRB is released.

According to an embodiment of the disclosure, an entity for configuring header compression of an SLRB, for example, a transmission terminal, a base station, or a network, may change a header compression configuration before one SLRB is released after being generated. In this case, a reception terminal may change a PDCP in-order delivery or PDCP out-of-order delivery configuration of the SLRB according to a header compression configuration change of the SLRB.

According to an embodiment, when a header compression configuration for an SLRB configured as PDCP in-order delivery is changed to header compression non-configuration, a terminal may configure PDCP out-of-order delivery for the SLRB when it is determined to be necessary. Here, application of the PDCP out-of-order delivery may be determined when a PC5 RRC configuration message including a header compression configuration change, and a PC5 RRC configuration complete message are normally exchanged between two terminals.

According to an embodiment, when a header compression configuration for an SLRB configured as PDCP out-of-order delivery is changed to using header compression, a terminal may configure PDCP in-order delivery for the SLRB. Here, application of the PDCP in-order delivery may be determined when a PC5 RRC configuration message including a header compression configuration change, and a PC5 RRC configuration complete message are normally exchanged between two terminals.

Figure 12:
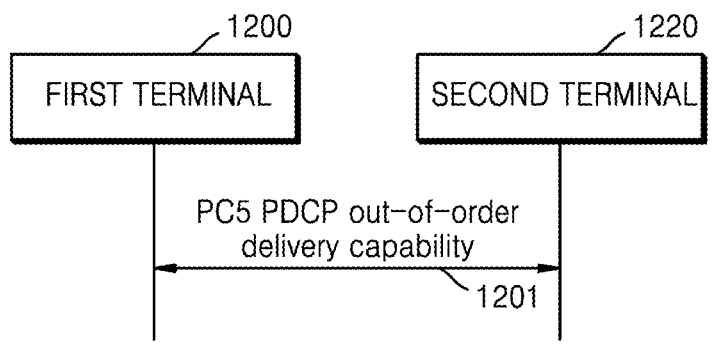
FIG. 12 illustrates operations of processing PDCP out-of-order delivery capability information, according to various embodiments of the disclosure.

FIG. 12 illustrates operations of processing PDCP out-of-order delivery capability information, according to various embodiments of the disclosure.

Referring to FIG. 12, a first terminal 1200 and a second terminal 1220 configuring a sidelink unicast connection may exchange signaling including sidelink capability information, in operation 1201. The signaling of operation 1201 may include at least one of an SL capability enquiry message and an SL capability information message. The signaling of operation 1201 may include information about PDCP out-of-order delivery support. According to an embodiment, the first terminal 1200 and the second terminal 1220 may determine whether PDCP out-of-order delivery is configured for a sidelink unicast-based SLRB, based on the information about PDCP out-of-order delivery support.

According to an embodiment, a configuration of the PDCP out-of-order delivery may be performed based on a capability information exchange regarding sidelink PDCP out-of-order delivery of terminals or performed without the capability information exchange regarding the sidelink PDCP out-of-order delivery of the terminals. The terminal may exchange capability information regarding PDCP out-of-order delivery through at least one of the procedures of FIG. 8A, FIG. 8B, FIG. 8C, and FIG. 12. When the terminal directly configures PDCP out-of-order delivery or PDCP in-order delivery for an SLRB, the terminal may refer to PDCP out-of-order delivery capability information determined through at least one of the procedures of FIG. 8A, FIG. 8B, FIG. 8C, and FIG. 12. For example, in the embodiment of FIG. 10, 11A, or 11B, when a transmission terminal or reception terminal directly configures a PDCP out-of-order delivery configuration, the transmission terminal or reception terminal may consider PDCP out-of-order delivery capability information as one of PDCP out-of-order delivery configuration standards in FIG. 10, 11A, or 11B.

The methods according to the embodiments of the disclosure described in the claims or the detailed description of the disclosure may be implemented in hardware, software, or a combination of hardware and software.

When the methods are implemented in software, a computer-readable recording medium having one or more programs (software modules) recorded thereon may be provided. The one or more programs recorded on the computer-readable recording medium are configured to be executable by one or more processors in a device. The one or more programs include instructions to execute the methods according to the embodiments of the disclosure described in the claims or the detailed description of the disclosure.

The programs (e.g., software modules or software) may be stored in random access memory (RAM), non-volatile memory including flash memory, read-only memory (ROM), electrically erasable programmable read-only memory (EEPROM), a magnetic disc storage device, compact disc-ROM (CD-ROM), a digital versatile disc (DVD), another type of optical storage device, or a magnetic cassette. Alternatively, the programs may be stored in a memory including a combination of some or all of the above-mentioned memories. In addition, there may be a plurality of memories.

The programs may also be stored in an attachable storage device which is accessible through a communication network such as the Internet, an intranet, a local area network (LAN), a wireless LAN (WLAN), or a storage area network (SAN), or a combination thereof. The storage device may be connected through an external port to an apparatus according the embodiments of the disclosure. Another storage device on the communication network may also be connected to the apparatus performing the embodiments of the disclosure.

In the afore-described embodiments of the disclosure, elements included in the disclosure are expressed in a singular or plural form according to the embodiments. However, the singular or plural form is appropriately selected for convenience of explanation and the disclosure is not limited thereto. As such, an element expressed in a plural form may also be configured as a single element, and an element expressed in a singular form may also be configured as plural elements.

Meanwhile, the embodiments described with reference to the present specification and the drawings are merely illustrative of specific examples to easily facilitate description and understanding of the disclosure, and are not intended to limit the scope of the disclosure. In other words, it will be apparent to one of ordinary skill in the art that other modifications based on the technical ideas of the disclosure are feasible. Also, the embodiments may be combined with each other as required. For example, a portion of one embodiment of the disclosure and a portion of another embodiment of the disclosure may be combined with each other. In addition, modified examples of the embodiments based on the technical ideas of the embodiments may be implemented in other systems, such as LTE systems, 5G or NR communication systems.

The invention claimed is:

1. An operation method of a first user equipment (UE) in a wireless communication system, the operation method comprising:
    transmitting, to a second UE, first UE sidelink capability information including out-of-order delivery capability information of a packet data convergence protocol (PDCP) layer of the first UE;
    receiving, from the second UE, second UE sidelink capability information including out-of-order delivery capability information of a PDCP layer of the second UE;
    receiving, from the second UE, configuration information configured for a sidelink radio bearer, wherein the configuration information includes information on whether out-of-order delivery is configured or not; and
    processing sidelink data received from the second UE, based on the configuration information, wherein the processing of the sidelink data received from the second UE comprises:
        receiving, from a lower layer, a PDCP data protocol data unit (PDU) by the PDCP layer of the first UE;
        identifying whether out-of-order delivery is configured for the sidelink radio bearer; and
        transmitting, to an upper layer, a PDCP service data unit (SDU) by the PDCP layer of the first UE in case that the out-of-order delivery is configured for the sidelink radio bearer.

2. The operation method of claim 1, wherein the first UE sidelink capability information is transmitted to the second UE via PC5 radio resource control (RRC) signaling.

3. The operation method of claim 1, wherein the configuration information is received from the second UE via PC5 RRC signaling.

4. The operation method of claim 1, wherein the configuration information and the first UE sidelink capability information are applied to sidelink unicast communication.

5. A first user equipment (UE) in a wireless communication system, the first UE comprising:
a transceiver; and
at least one processor configured to operate by being connected to the transceiver, wherein the at least one processor is further configured to:
transmit, to a second UE through the transceiver, first UE sidelink capability information including out-of-order delivery capability information of a packet data convergence protocol (PDCP) layer of the first UE;
receive, from the second UE, second UE sidelink capability information including out-of-order delivery capability information of a PDCP layer of the second UE;
receive, from the second UE, configuration information configured for a sidelink radio bearer, wherein the configuration information includes information on whether out-of-order delivery is configured or not;
process sidelink data received from the second UE, based on the configuration information;
control the PDCP layer of the first UE to receive a PDCP data protocol data unit (PDU) from a lower layer;
identify whether out-of-order delivery is configured for the sidelink radio bearer; and
control the PDCP layer of the first UE to transmit a PDCP service data unit (SDU) to an upper layer in case that the out-of-order delivery is configured for the sidelink radio bearer.

6. The first UE of claim 5, wherein the first UE sidelink capability information is transmitted to the second UE via PC5 radio resource control (RRC) signaling.

7. The first UE of claim 5, wherein the configuration information is received from the second UE via PC5 RRC signaling.

8. The first UE of claim 5, wherein the configuration information and the first UE sidelink capability information are applied to sidelink unicast communication.

* * * * *